US010791395B2

(12) United States Patent
Kamio et al.

(10) Patent No.: US 10,791,395 B2
(45) Date of Patent: Sep. 29, 2020

(54) FLYING OBJECT DETECTION SYSTEM AND FLYING OBJECT DETECTION METHOD

(71) Applicant: PANASONIC I-PRO SENSING SOLUTIONS CO., LTD., Fukuoka (JP)

(72) Inventors: Takashi Kamio, Kanagawa (JP); Norio Saitou, Kanagawa (JP); Eisuke Hiraoka, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 16/268,110

(22) Filed: Feb. 5, 2019

(65) Prior Publication Data

US 2020/0045416 A1   Feb. 6, 2020

(30) Foreign Application Priority Data

May 31, 2018 (JP) .................................. 2018-105396

(51) Int. Cl.
*H04R 29/00* (2006.01)
*H04R 1/40* (2006.01)
*G10K 11/26* (2006.01)

(52) U.S. Cl.
CPC ............. *H04R 1/406* (2013.01); *G10K 11/26* (2013.01); *H04R 29/005* (2013.01)

(58) Field of Classification Search
CPC ....... H04R 29/005; H04R 1/406; G10K 11/26
USPC .............................................. 381/56, 59, 58
See application file for complete search history.

(56) References Cited

U.S. PATENT DOCUMENTS

| 2014/0376740 | A1 | 12/2014 | Shigenaga et al. |
| 2015/0350621 | A1 | 12/2015 | Sawa et al. |
| 2016/0321920 | A1* | 11/2016 | Hayasaka .............. G08G 1/052 |
| 2017/0132474 | A1 | 5/2017 | Matsumoto et al. |
| 2018/0115759 | A1 | 4/2018 | Sawa et al. |
| 2018/0115760 | A1 | 4/2018 | Sawa et al. |
| 2018/0168919 | A1* | 6/2018 | Fung ..................... A61H 19/30 |

FOREIGN PATENT DOCUMENTS

| JP | 2014-143678 | 8/2014 |
| JP | 2015-029241 | 2/2015 |
| JP | 2018-026792 | 2/2018 |
| JP | -2018136233 A * | 8/2018 |
| JP | 2018136233 A * | 8/2018 |

* cited by examiner

*Primary Examiner* — Ammar T Hamid
(74) *Attorney, Agent, or Firm* — Greenblum & Bernstein, P.L.C.

(57) ABSTRACT

A flying object detection system includes a sensor including a microphone array configured to collect a sound in a first detection area of a monitoring area, a radar configured to measure a distance to a flying object by detecting the flying object in flight in a second detection area of the monitoring area, and a control device configured to detect presence or absence of the flying object based on sound data on the sound in the first detection area collected by the microphone array, and configured to receive the distance to the flying object. The control device is configured to display information on a position of the flying object viewed from arrangement places of the sensor and the radar based on the distance to the flying object and a detection output of the flying object by the radar on a first monitor.

18 Claims, 20 Drawing Sheets

FLYING OBJECT DETECTION SYSTEM AND FLYING OBJECT DETECTION METHOD

BACKGROUND OF THE INVENTION

1. Field of the Invention

The present disclosure relates to a flying object detection system and a flying object detection method for detecting a flying object in flight in a monitoring area.

2. Background Art

In JP-A-2018-26792, disclosed is an unmanned flying object detection system that detects presence or absence of an unmanned flying object appearing in a monitoring area using sound data in which a sound of the monitoring area is collected by a microphone array including a plurality of microphones. When image data in the monitoring area imaged by an omnidirectional camera are displayed on a monitor, the unmanned flying object detection system superimposes an identification mark that is obtained by converting the unmanned flying object into a visual image on the image data in the monitoring area, thereby displaying the superimposed identification mark thereon.

In a configuration disclosed in JP-A-2018-26792, the sound data collected in the monitoring area is used for detecting the presence or absence of the unmanned flying object. For this reason, in JP-A-2018-26792, for example, when the unmanned flying object is flying at a position which is separated from the microphone array more than a predetermined distance, there exists a possibility that detection accuracy of the unmanned flying object may deteriorate because the microphone array receives an influence of other sound sources, and the like generated in the monitoring area. Therefore, when the unmanned flying object does not exist within a predetermined distance range from the microphone array, it is difficult to find the unmanned flying object in an early stage even when the unmanned flying object actually moves over the sky, and the like. As a result, it is difficult to take countermeasures such as an effective initial action, and the like against, for example, unpredicted circumstances, thereby causing deterioration in convenience of a user.

SUMMARY OF THE INVENTION

In consideration of the above-mentioned circumstances, the present disclosure has been made in an effort to provide a flying object detection system and a flying object detection method not only capable of detecting presence or absence of an unmanned flying object in a monitoring area at an early stage regardless of a sound environment state in the monitoring area, but also capable of suppressing deterioration in convenience of a user.

The present disclosure provides a flying object detection system having a sensor including a microphone array configured to collect a sound in a first detection area of a monitoring area, a radar configured to measure a distance to a flying object by detecting the flying object in flight in a second detection area of the monitoring area, and a control device configured to detect presence or absence of the flying object based on sound data on the sound in the first detection area collected by the microphone array, and configured to receive the distance to the flying object. The control device is configured to display information on a position of the flying object viewed from arrangement places of the sensor and the radar based on the distance to the flying object and a detection output of the flying object by the radar on a first monitor.

The present disclosure also provides a flying object detection method having steps of collecting a sound in a first detection area of a monitoring area by a sensor, measuring a distance to a flying object by detecting the flying object in flight in a second detection area of the monitoring area by a radar, detecting presence or absence of the flying object based on sound data on the sound in the first detection area, and receiving the distance up to the flying object, and displaying information on a position of the flying object viewed from arrangement places of the sensor and the radar based on the distance to the flying object and a detection output of the flying object by the radar on a first monitor.

According to the present disclosure, it is advantageously possible not only to detect the presence or absence of the unmanned flying object in the monitoring area at the early stage regardless of the sound environment state in the monitoring area, but also to suppress the deterioration in the convenience of the user.

DETAILED DESCRIPTION OF THE EXEMPLARY EMBODIMENT

Figure 1:
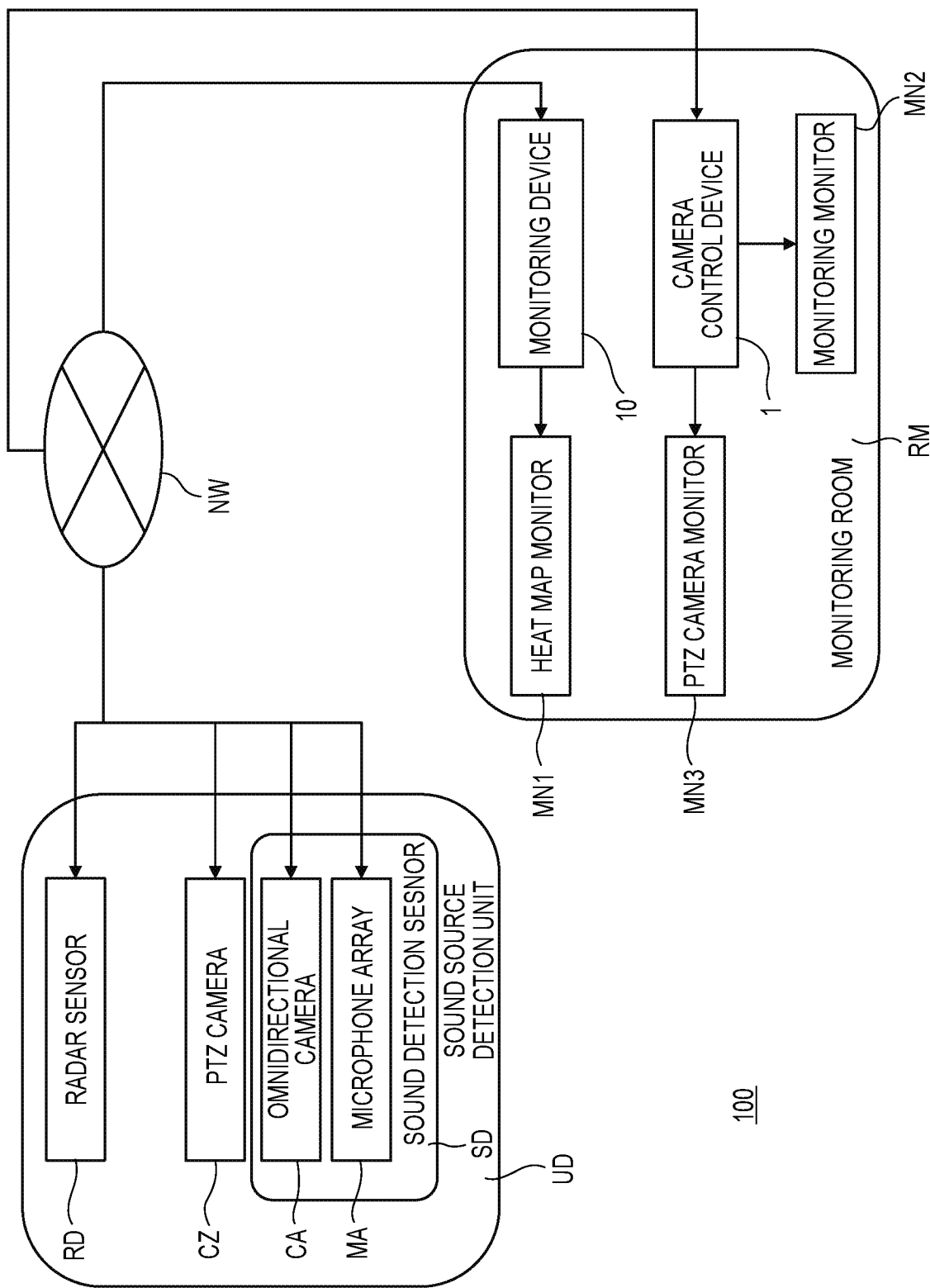
FIG. 1 is a diagram illustrating a system configuration example of a flying object detection system according to a first exemplary embodiment.

Hereinafter, appropriately referring to the drawings, exemplary embodiments in which a flight object detection system and a flight object detection method according to the present disclosure are specifically disclosed will be described in detail. However, detailed descriptions more than necessary will be omitted. For example, detailed descriptions of already well-known matters or redundant descriptions on substantially the same configuration will be omitted. This is to avoid unnecessary redundancy of the following descriptions and to facilitate the understanding of those skilled in the art. Further, the accompanying drawings and the following descriptions are provided to enable those skilled in the art to fully understand the present disclosure, and are not intended to limit the subject matter described within the scope of the claims.

As a flying object detected by a flying object detection system, an unmanned flying object (for example, a UAV (Unmanned Aerial Vehicle) such as a drone) flying in a monitoring area of a monitoring object (for example, an outdoor area such as a residential area of an urban dweller, and the like) will be described as an exemplification. Further, the present disclosure can be respectively defined as a flying object detection device forming a flying object detection system, a flying object detection method performed by the flying object detection device, and a flying object detection method performed by the flying object detection system.

Hereinafter, a user of the flying object detection system (for example, a supervisor who looks around and guards the monitoring area) is simply referred to as a "user".

In a first exemplary embodiment, a flying object detection system 100 includes a sound detection sensor SD including a microphone array MA capable of collecting a sound in a first detection area (for example, a sound detection area SDar) of the monitoring area; and a radar sensor RD that detects a flying object (for example, a drone DN) in flight in a second detection area (for example, a radar detection area RDar) of the monitoring area and then measures a distance up to the flying object. Further, the flying object detection system 100 includes a control device (for example, a monitoring device 10) that not only detects the presence or absence of the flying object based upon the collected sound data in the first detection area, but also receives the measured distance up to the flying object. The control device displays information indicating a position of the flying object viewed from arrangement places of the sound detection sensor SD and the radar sensor RD on a monitor (for example, a monitoring monitor MN2) using the distance up to the flying object and a detection output of the flying object.

For example, the flying object is a drone that autonomously ascends, descends, turns to the left, moves to the left, turns to the right, moves to the right using a GPS (Global Positioning System) function or flies by performing an action having a plurality of degrees of freedom using the combinations thereof, or is a radio control helicopter, and the like flying by radio control of a third party. For example, the unmanned flying object can be used for various purposes such as aerial photographing, monitoring, chemical spraying, transportation of goods, and the like of a destination or a target object.

Hereinafter, as the flying object, a multi-copter type drone on which a plurality of rotors (in other words, rotary blades) are mounted will be described as an example. In the multi-copter type drone, when the number of blades of the rotor is generally two pieces, a harmonic wave having a frequency twice as high as a specific frequency and a harmonic wave having a frequency multiplied thereby are generated. In the same manner, when the number of blades of the rotor is three pieces, a harmonic wave having a frequency three times as high as the specified frequency and a harmonic wave having a frequency multiplied thereby are generated. The same also applies to a case in which the number of blades of the rotor is more than four pieces.

FIG. 1 is a diagram illustrating a system configuration example of the flying object detection system 100 according to the first exemplary embodiment. The flying object detection system 100 is configured to include a sound source detection unit UD, a camera control device 1, the monitoring device 10, a heat map monitor MN1, a monitoring monitor MN2, and a PTZ camera monitor MN3. The sound source detection unit UD, the monitoring device 10, and the camera control device 1 are communicably connected to each other via a network NW. The network NW may be a wired network (for example, an intranet, the Internet, a wired LAN (Local Area Network), or a wireless network (for example, a wireless LAN). All of the camera control device 1, the monitoring device 10, the heat map monitor MN1, the monitoring monitor MN2, and the PTZ camera monitor MN3 are installed in a monitoring room RM where the user resides at the time of monitoring.

The sound source detection unit UD includes the sound detection sensor SD, a PTZ camera CZ, and the radar sensor RD. The sound detection sensor SD includes the microphone array MA and an omnidirectional camera CA. Further, the PTZ camera CZ may be also configured to be included in the sound detection sensor SD.

The flying object detection system 100 detects the presence or absence of the unmanned flying object (for example, a drone) flying in the sound detection area SDar of the monitoring area (refer to the above-mentioned descriptions) based upon the sound data in the sound detection area SDar (refer to FIG. 13, an example of the first detection area) of the monitoring area collected by the sound detection sensor SD. The flying object detection system 100 can acquire not only a fact that a drone in flight in the radar detection area RDar (refer to FIG. 13, an example of the second detection area) is detected by the radar sensor RD, but also a piece of distance information which is measured by the radar sensor RD from a place where the radar sensor RD is disposed to the drone by the radar sensor RD.

In the sound detection sensor SD, the microphone array MA collects a sound in an omnidirectional direction (that is, 360°) in the sound detection area SDar of the monitoring area from a place where the microphone array MA is installed as a starting point in a non-directional state. The microphone array MA includes a housing 15 (refer to FIG.

2) in which a circular opening part having a predetermined width is formed at a center. The sound collected by the microphone array MA includes, for example, a mechanical operation sound such as the drone DN, a sound generated by a human, and other sounds, and may include a low frequency sound lower than an audible frequency and an ultrasonic sound exceeding the audible frequency without being limited to a sound in a range of the audible frequency (that is, 20 Hz to 20 kHz).

Figure 3:
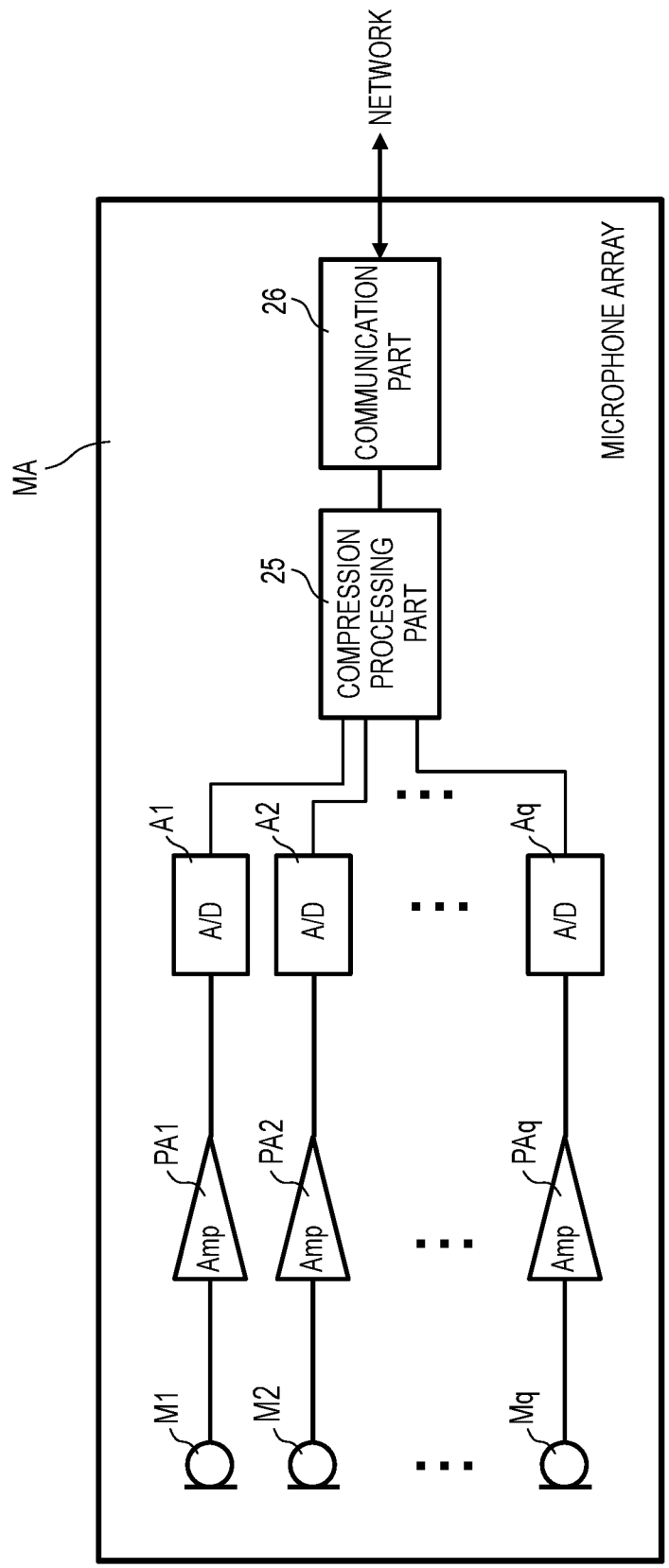
FIG. 3 is a block diagram illustrating an internal configuration example of a microphone array.

The microphone array MA includes a plurality of non-directional microphones M1 to Mq (refer to FIG. 3). Herein, q is a natural number of two or more. The microphones M1 to Mq are disposed at a predetermined space concentrically (for example, a uniform space) around the circular opening part provided in the housing 15 along a circumferential direction. For example, an electret condenser microphone (ECM: Electret Condenser Microphone) is used as the microphones M1 to Mq. The microphone array MA transmits a sound data signal obtained by collecting the sounds of the respective microphones M1 to Mq to the monitoring device 10 via the network NW. Further, the arrangement of the microphones M1 to Mq is an example and other arrangements (for example, a square arrangement or a rectangular arrangement) may be adopted, but it is desirable that the microphones M1 to Mq are arranged side by side at an equal space.

The microphone array MA includes a plurality of the microphones M1 to Mq (for example, q=32) and a plurality of amplifiers PA1 to PAq (refer to FIG. 3) which respectively amplify output signals of the plurality of microphones M1 to Mq. Analog signals outputted from the respective amplifiers are respectively converted into digital signals by A/D converters A1 to Aq (refer to FIG. 3). Further, the number of microphones in the microphone array MA is not limited to 32 pieces, and other numbers (for example, 16 pieces, 64 pieces, and 128 pieces) may be used as well.

The omnidirectional camera CA which approximately coincides with a volume of the circular opening part is stored inside the circular opening part formed at the center of the housing 15 (refer to FIG. 2) of the microphone array MA. That is, the microphone array MA and the omnidirectional camera CA are integrated and are disposed so that the respective housing centers are in the same axial direction (refer to FIG. 2).

The omnidirectional camera CA as an example of a camera is a camera on which a fisheye lens 45a (refer to FIG. 4) capable of imaging the omnidirectional image (that is, 360°) of the monitoring area is mounted. For example, a sound collection area of the microphone array MA and an imaging area of the omnidirectional camera CA are both described as a common monitoring area, but spatial dimensions (for example, volumes) of the sound collection area and the imaging area may not be the same. For example, the volume of the sound collection area may be larger or smaller than the volume of the imaging area. In short, the sound collection area and the imaging area may have a space portion in common. The omnidirectional camera CA functions, for example, as a monitoring camera capable of imaging a place where the sound source detection unit UD is installed in the monitoring area. That is, the omnidirectional camera CA includes an angle of view in which, for example, the vertical direction is 180° and the horizontal direction is 360°, and images a monitoring area 8 (refer to FIG. 17), which is a half celestial sphere as the imaging area. Further, the omnidirectional camera CA may transmit data of an omnidirectional captured image obtained by the image capturing to the monitoring device 10, and may transmit the data thereof to the camera control device 1 (refer to a dotted line).

In the sound source detection unit UD, the omnidirectional camera CA is fitted inside the circular opening part of the housing 15, such that the omnidirectional camera CA and the microphone array MA are coaxially disposed. Accordingly, an optical axis L1 (refer to FIG. 2) of the omnidirectional camera CA coincides with a center axis of the housing of the microphone array MA, so that the imaging area and the sound collection area in an axial circumferential direction (that is, the horizontal direction) become approximately the same, whereby a position of a subject (in other words, a direction indicating a position of a subject when viewed from the omnidirectional camera CA) in the omnidirectional image captured by the omnidirectional camera CA and a position of a sound source (in other words, a direction indicating a position of a sound source when viewed from the microphone array MA) which becomes a target whose sound is collected by the microphone array MA can be represented by the same coordinate system (for example, coordinates indicated by a horizontal angle and a vertical angle). Further, in order to detect the drone DN flying over the sky, the sound source detection unit UD is mounted, for example, so that an upward direction in the vertical direction becomes a sound collection surface and an imaging surface (refer to FIG. 2).

The PTZ camera CZ is a camera capable of changing an optical axis direction and a zoom magnification of the own camera by respectively performing pan rotation, tilt rotation, and a zoom magnification change according to a PTZ (pan and tilt zoom) control instruction from the camera control device 1. The PTZ camera CZ transmits data of an image (a PTZ captured image) obtained by the image capturing to the monitoring device 10 via the network NW. Further, the PTZ camera CZ may transmit the data of the PTZ captured image obtained by the image capturing to the camera control device 1 (refer to a dotted line).

The radar sensor RD transmits a predetermined detection signal (for example, a pulse signal) into the radar detection area RDar (refer to FIG. 13, an example of the second detection area) of the monitoring area from the place where the radar sensor RD is installed as a starting point, and receives a signal reflected by the drone DN in flight in the radar detection area RDar. The radar sensor RD detects the presence or absence of the drone DN in flight in the radar detection area RDar according to a comparison result between a correlation value calculated by signal processing using the predetermined detection signal and the signal reflected by the drone DN and a predetermined threshold value. Further, the radar sensor RD can measure the distance up to the drone DN when detecting the drone DN. The radar sensor RD associates a fact that the drone DN is detected with a measurement result of the distance up to the drone DN, and then transmits the associated measurement thereof to the monitoring device 10 via the network NW.

The monitoring device 10 as an example of the control device is configured using a computer, for example, such as a PC (a personal computer), and the like. The monitoring device 10 forms directivity (that is, beamforming) in which an arbitrary direction is a main beam direction based upon a user's operation in an omnidirectional sound collected by the microphone array MA, and can emphasize a sound in a directivity direction. Further, the details of processing for forming the directivity in the sound data by performing the beamforming on the sound collected by the microphone array MA are well-known technologies, for example, as described in JP-A-2014-143678 and JP-A-2015-029241 (reference patent literatures).

The monitoring device 10 cuts out the omnidirectional captured image having an angle of view of 360° or a specific range (direction) portion of the omnidirectional captured image using the captured image captured by the omnidirectional camera CA, thereby generating a panorama captured image (hereinafter referred to as the "omnidirectional captured image") which is converted into two dimensions. Further, the omnidirectional captured image may not be generated by the monitoring device 10, but may be generated by the omnidirectional camera CA.

The monitoring device 10 superimposes a sound pressure heat map image HMP1 (refer to FIG. 9) that is generated based upon a calculation value of a sound parameter (for example, a sound pressure level) specifying a magnitude of the sound collected by the microphone array MA on the omnidirectional captured image captured by the omnidirectional camera CA, thereby displaying the superimposed sound pressure heat map image HMP1 on the heat map monitor MN1.

The monitoring device 10 may display a marker image (refer to a marker image MK1 illustrated in FIG. 9 or FIG. 10) which is easy for a user to visually distinguish the detected drone DN at a position (that is, coordinates) of the drone DN corresponding to the omnidirectional captured image IMG1. In the omnidirectional captured image IMG1, for example, when the user views the omnidirectional captured image IMG1, the marker image is an image in which the position of the drone DN can be explicitly distinguished to such an extent that the marker image can be clearly distinguished from other subjects.

The camera control device 1 is configured using a computer, for example, such as a PC, and the like in the same manner as that of the monitor 10. The camera control device 1 controls execution of the operation of the PTZ camera CZ (for example, at least one of the pan rotation, the tilt rotation, and the zoom magnification change) according to a PTZ control instruction (refer to FIGS. 14 and 20) transmitted from the monitor device 10 based upon a fact that the drone DN is detected. The camera control device 1 displays the image (the PTZ captured image) captured by the PTZ camera CZ on the PTZ camera monitor MN3.

Figure 9:
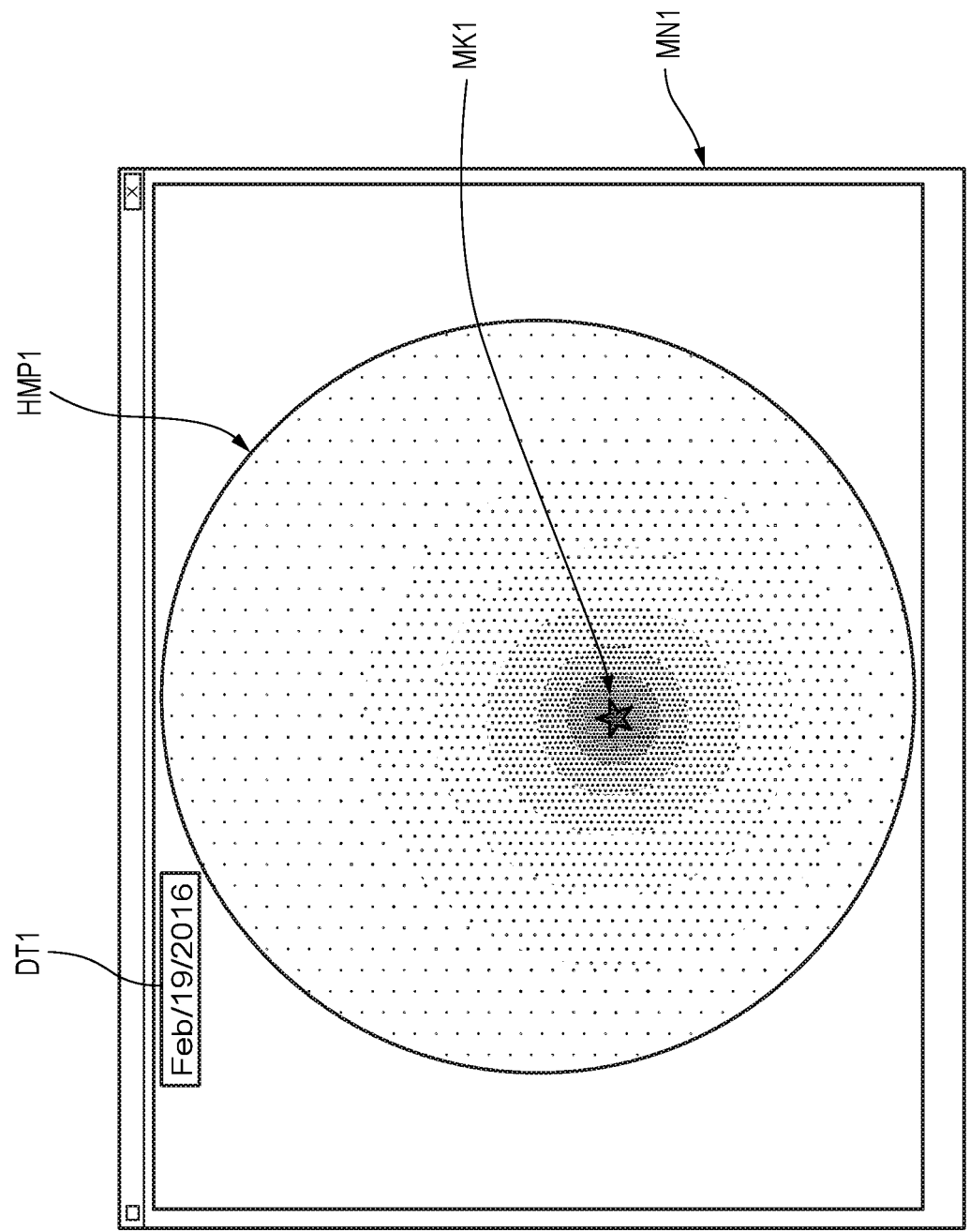
FIG. 9 is a diagram illustrating a display example of a sound pressure heat map image displayed on a heat map monitor.

The heat map monitor MN1 is configured using, for example, a liquid crystal display device (Liquid Crystal Display) and is connected to the monitoring device 10, and further is a monitor which displays the sound pressure heat map image HMP1 (refer to FIG. 9) generated by the monitor device 10 on a screen (refer to FIG. 9).

Figure 10:
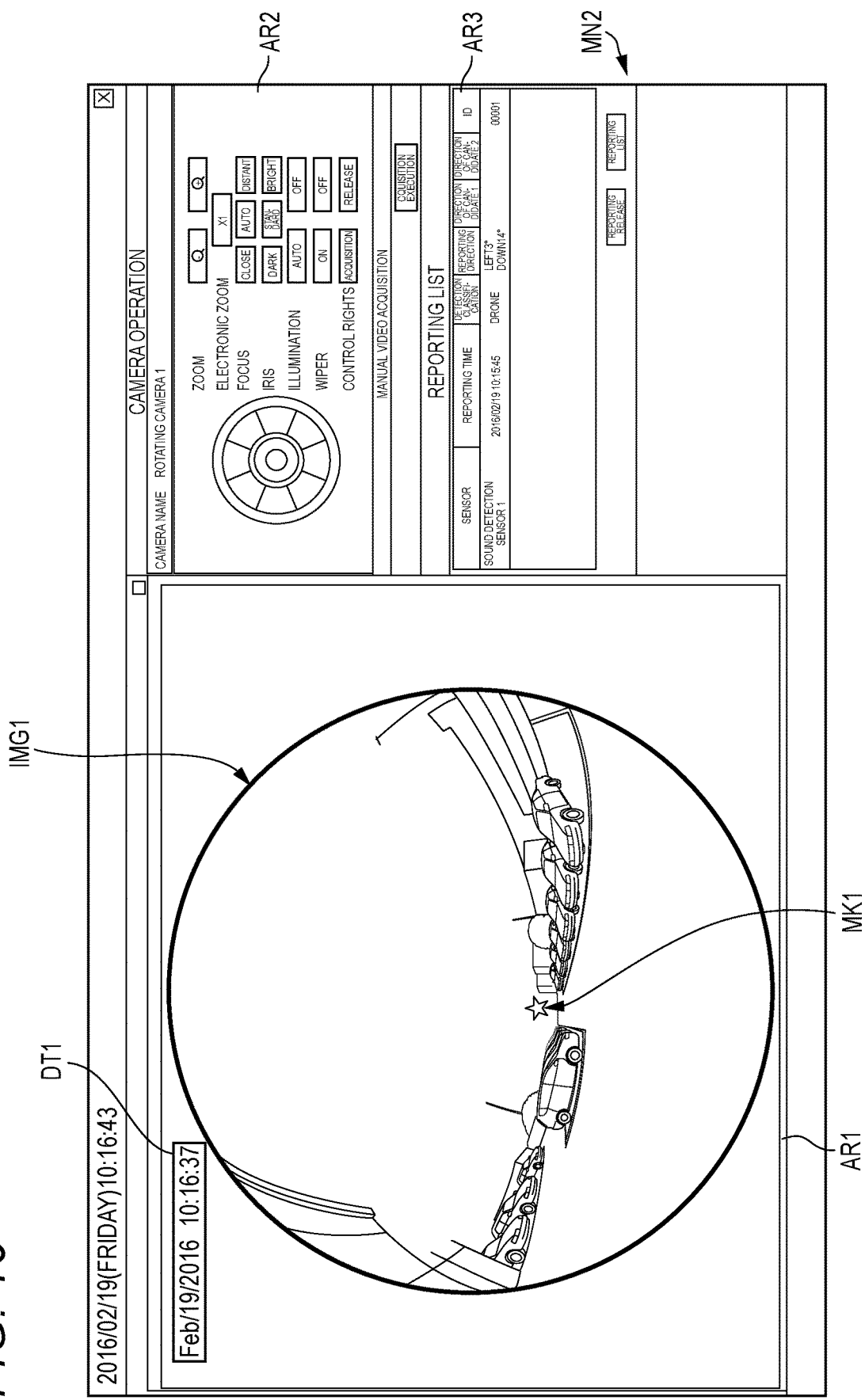
FIG. 10 is a diagram illustrating a display example of a monitoring image screen displayed on a monitoring monitor.
Figure 11:
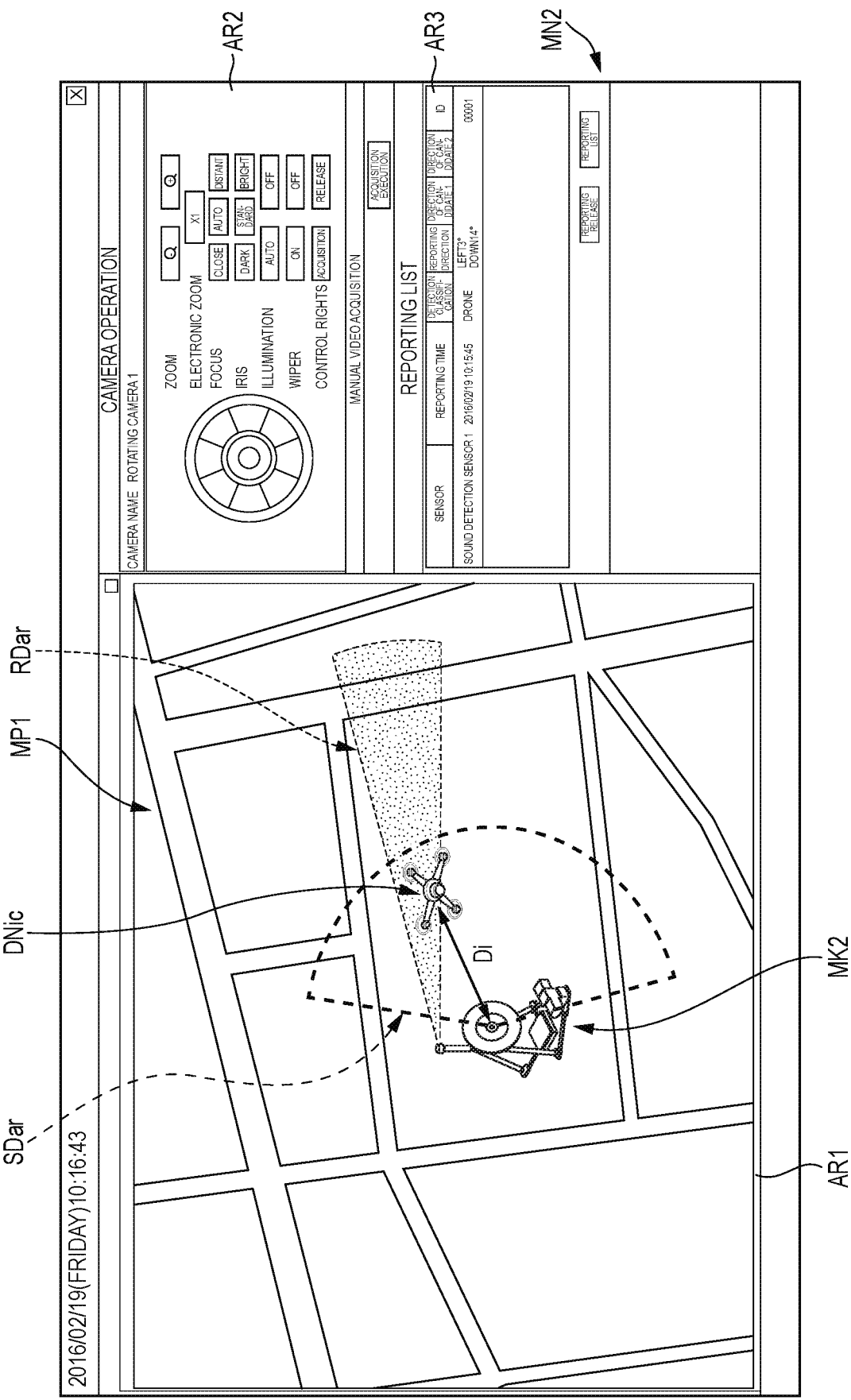
FIG. 11 is a diagram illustrating a display example of a map display screen displayed on the monitoring monitor.

The monitoring monitor MN2 as an example of a monitor is configured using, for example, the liquid crystal display device and is connected to the camera control device 1, and further is a monitor which switches the omnidirectional captured image IMG1 captured by the omnidirectional camera CA or the map MP1 (refer to FIG. 11) of the monitoring area 8 according to the user's operation and displays the switched omnidirectional captured image IMG1 or the switched map MP1 on a browser screen (refer to FIG. 10 or FIG. 11).

The PTZ camera monitor MN3 as an example of the second monitor is configured using, for example, the liquid crystal display device and is connected to the camera control device 1, and further is a monitor which displays a PTZ captured image IMG2 (refer to FIG. 12) captured by the PTZ camera CZ on the screen.

Figure 2:
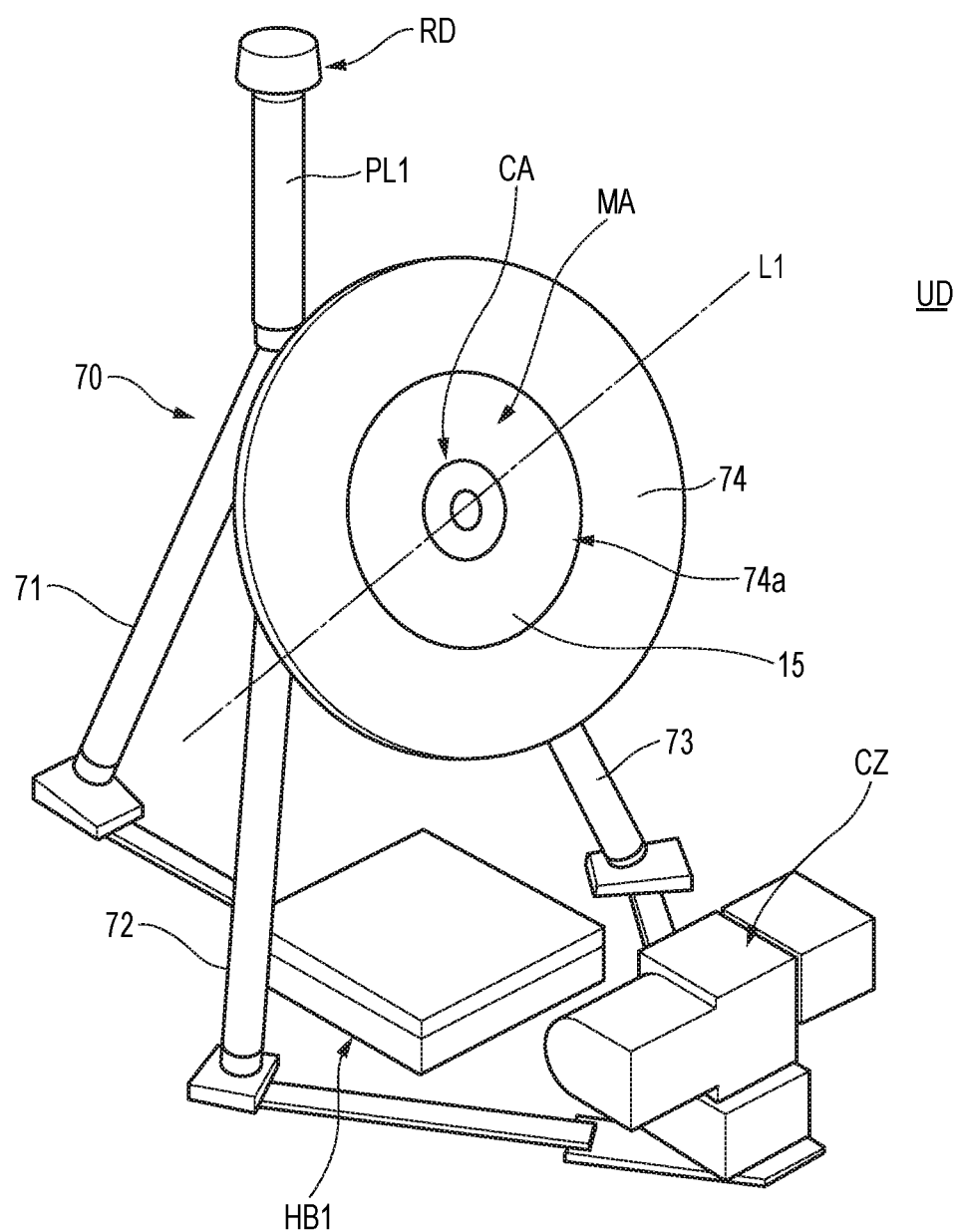
FIG. 2 is a diagram illustrating an appearance example of a sound source detection unit.

FIG. 2 is a diagram illustrating an appearance example of the sound source detection unit UD. As described with reference to FIG. 1, the sound source detection unit UD includes the microphone array MA, the omnidirectional camera CA, the radar sensor RD, and the PTZ camera CZ. Further, as illustrated in FIG. 2, the sound source detection unit UD includes a support base 70 for mechanically supporting the microphone array MA, the omnidirectional camera CA, and the radar sensor RD. The support base 70 includes a structure in which three leg parts 71, 72, and 73 (that is, a tripod) that supports the support base 70 to be fixed to the ground of the arrangement place of the sound source detection unit UD, and a mounting plate 74 are combined with each other.

The mounting plate 74 is a disk-shaped plate material. A circular opening part 74a is formed at a center of the mounting plate 74. The housing 15 of the microphone array MA is stored and fixed in the circular opening part 74a.

The radar sensor RD is supported by one end side (a side opposite to the ground) of a pole PL1 extending in the vertical direction from a joint part of the tripod (that is, the three legs 71, 72, and 73). As illustrated in FIG. 2, the radar sensor RD and the sound detection sensor SD (for example, the microphone array MA, the omnidirectional camera CA) are disposed within a predetermined distance (that is, within a short distance), and the radar sensor RD is disposed above the sound detection sensor SD. Accordingly, the detection signal irradiated (transmitted) from the radar sensor RD is hardly obstructed by an obstacle, and the like existing in the monitoring area 8, thereby making it possible to suppress deterioration in detection accuracy of the drone DN.

Further, in a hub housing HUB 1 installed on the ground just below the mounting plate 74, a power supply device (not illustrated) capable of supplying power to the omnidirectional camera CA, the microphone array MA, the PTZ camera CZ, and the radar sensor RD, and a hub device (not illustrated) for concentrating wires, and the like and performing communication with the network NW are incorporated. Therefore, the omnidirectional camera CA, the microphone array MA, the PTZ camera CZ, and the radar sensor RD can be operated by receiving power supply from the power supply device respectively incorporated in the hub housing HUB1. Further, the PTZ camera CZ may include an illumination part LGT1 (refer to FIG. 5) so as to be able to capture an image even at night, and the like.

FIG. 3 is a block diagram illustrating an internal configuration example of the microphone array. The microphone array MA illustrated in FIG. 3 is configured to include the plurality of microphones M1 to Mq (for example, q=32); the plurality of amplifiers PA1 to PAq which respectively amplify the sound data signals outputted from the plurality of microphones M1 to Mq; the plurality of the A/D converters A1 to Aq which respectively convert analog sound data signals outputted from the respective amplifiers PA1 to PAq into digital sound data signals; a compression processing part 25; and a transmission part 26.

The compression processing part 25 generates a packet of the sound data signals based upon the digital sound data signals outputted from the A/D converters A1 to An. The transmission part 26 transmits the packet of the sound data signals generated by the compression processing part 25 (hereinafter simply referred to as "sound data") to the monitoring device 10 via the network NW.

Accordingly, when power is supplied from the power supply device (not illustrated) incorporated in the hub housing HUB1, the microphone array MA amplifies the sound data signals outputted from the microphones M1 to Mq by the amplifiers PA1 to PAq which are corresponding amplifiers (Amp), and then converts the amplified sound data signals into the digital sound data signals by the corresponding A/D converters A1 to Aq. Further, the microphone array MA generates the packet of the sound data signals in the compression processing part 25, and continuously transmits the packet of the sound data signals to the monitoring device 10 via the network NW.

Figure 4:
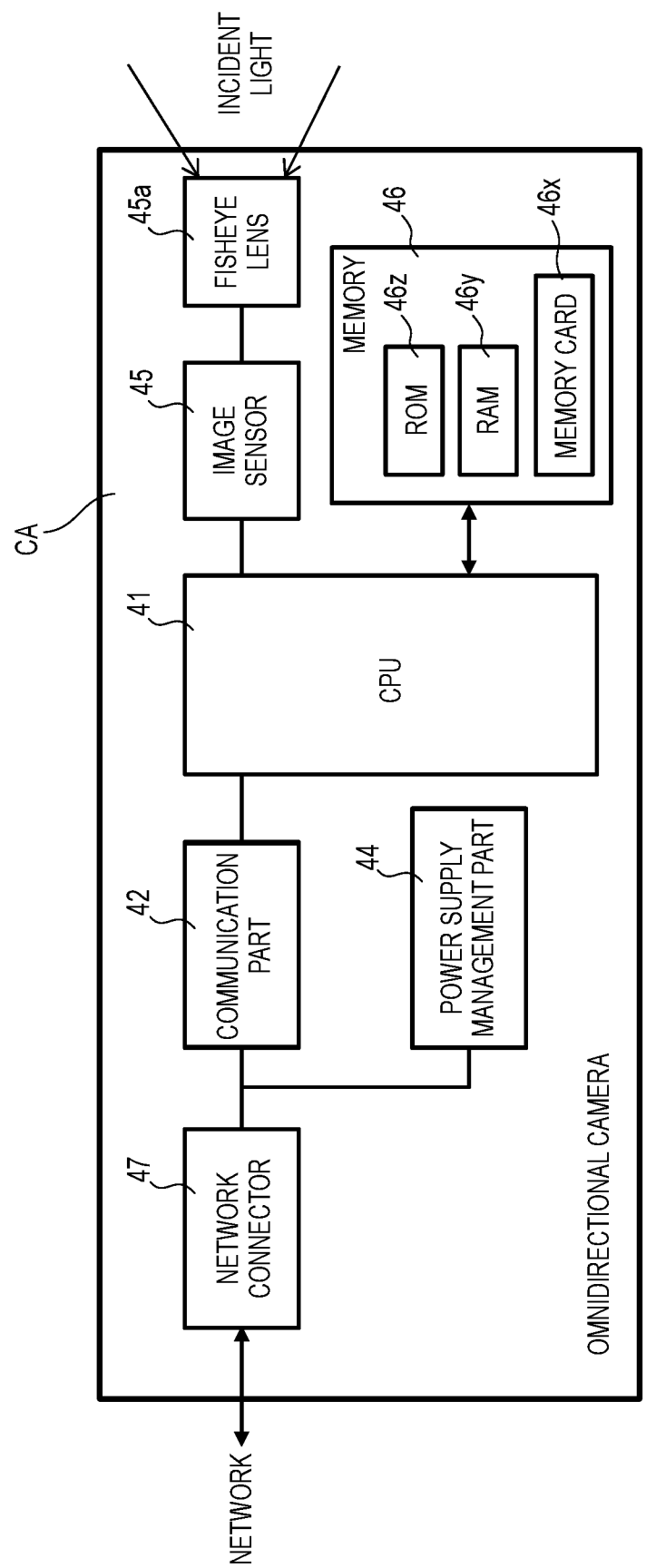
FIG. 4 is a block diagram illustrating an internal configuration example of an omnidirectional camera.

FIG. 4 is a block diagram illustrating an internal configuration example of the omnidirectional camera CA. The omnidirectional camera CA illustrated in FIG. 4 includes a CPU 41, a communication part 42, a power supply management part 44, an image sensor 45, the fisheye lens 45a, a memory 46, and a network connector 47.

The CPU 41 performs signal processing for totally controlling the operation of each part of the omnidirectional camera CA, input and output processing of data with other respective parts, data calculation processing, and data storage processing. A processor such as an MPU (Micro Processing Unit) or a DSP (Digital Signal Processor), and the like may be provided instead of the CPU 41.

For example, the CPU 41 generates two-dimensional panorama image data (that is, image data converted into two-dimensional panorama) obtained by cutting out an image in a specific range (direction) among the captured image data having the angle of view of 360° generated by the image sensor 45 according to designation of the user operating the monitoring device 10, thereby storing the generated two-dimensional panorama image data in the memory 46.

The image sensor 45 is configured using, for example, a CMOS (Complementary Metal Oxide Semiconductor) sensor or a CCD (Charge Coupled Device) sensor, and photoelectrically converts an optical image of an incident light from the monitoring area condensed by the fisheye lens 45a, thereby generating the captured image data of the monitoring area having the angle of view of 360° and transmitting the generated captured image data thereof to the CPU 41.

The fisheye lens 45a allows the incident light from all directions of the imaging area (that is, the monitoring area) to be incident and condenses the incident light, and then forms the optical image of the incident light on an imaging surface of the image sensor 45.

The memory 46 includes a ROM 46z which stores a program for defining the operation of the omnidirectional camera CA and data of a setting value; a RAM 46y which stores the captured image data having the angle of view of 360° or the panorama captured image data obtained by cutting out a range of a part of the captured image data, and work data; and a memory card 46x which is connected to the omnidirectional camera CAk so as to be freely inserted thereinto and stores various kinds of data.

The communication part 42 is a communication interface which controls data communication with the network NW connected via the network connector 47.

When the power is supplied from the power supply device (not illustrated) incorporated in the hub housing HUB 1, the power supply management part 44 supplies DC power to each part of the omnidirectional camera CA. Further, the power supply management part 44 may also supply the DC power to a device connected to the network NW via the network connector 47.

The network connector 47 is a connector capable of transmitting the captured image data having the angle of view of 360° or the panorama captured image data (that is, the above-mentioned omnidirectional captured image data) to the monitoring device 10 via the network NW, and is capable of supplying the power via a network cable.

Figure 5:
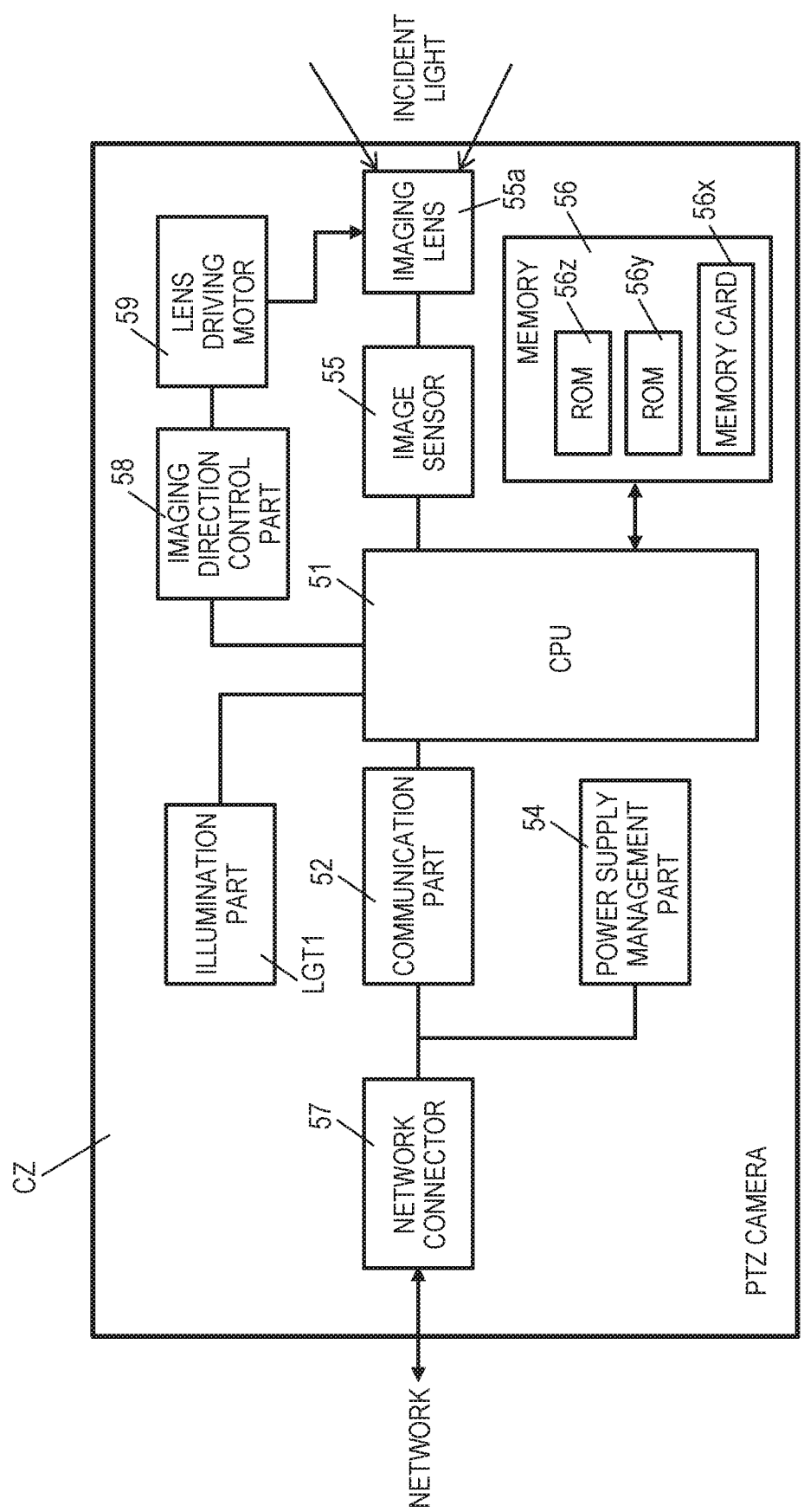
FIG. 5 is a block diagram illustrating an internal configuration example of a PTZ camera.

FIG. 5 is a block diagram illustrating an internal configuration example of the PTZ camera CZ. With respect to each part which is the same as that of the omnidirectional camera CA, a reference sign corresponding to each part in FIG. 4 will be denoted thereto, and the descriptions thereof will be omitted. The PTZ camera CZ is capable of adjusting the optical axis direction (that is, an imaging direction of the PTZ camera CZ) and the zoom magnification by the PTZ control instruction (refer to FIG. 14 or FIG. 20) from the camera control device 1.

In the same manner as that of the omnidirectional camera CA, the PTZ camera CZ includes a CPU 51, a communication part 52, a power supply management part 54, an image sensor 55, an imaging lens 55a, a memory 56, and a network connector 57 as well as an imaging direction control part 58, and a lens driving motor 59, and an illumination part LGT1. When receiving the PTZ control instruction (refer to FIG. 14 or FIG. 20) from the camera control device 1, the CPU 51 notifies the imaging direction control part 58 of a change instruction of the angle of view.

The imaging direction control part 58 controls the imaging direction of the PTZ camera CZ by controlling at least one of the pan direction and the tilt direction according to the change instruction of the angle of view notified from the CPU 51, and transmits a control signal for changing the zoom magnification to the lens driving motor 59 as necessary. The lens driving motor 59 drives the imaging lens 55a according to the control signal, changes the imaging direction (that is, an optical axis direction of the imaging lens 55a), and changes the zoom magnification by adjusting a focal distance of the imaging lens 55a.

The imaging lens 55a is configured using one or more than two lenses. In the imaging lens 55a, the optical axis direction of the pan rotation and the tilt rotation, or the zoom magnification is changed by driving the lens driving motor 59 according to the control signal from the imaging direction control part 58.

The illumination part LGT1 illuminates visible light or IR (near infrared light) in the imaging direction (in other words, the optical axis direction of the imaging lens 55a) according to the instruction from the CPU 51. Accordingly, the PTZ camera CZ performs the illumination, for example, in a dark place or at night, and the like, thereby making it possible to accurately image the subject.

Figure 6:
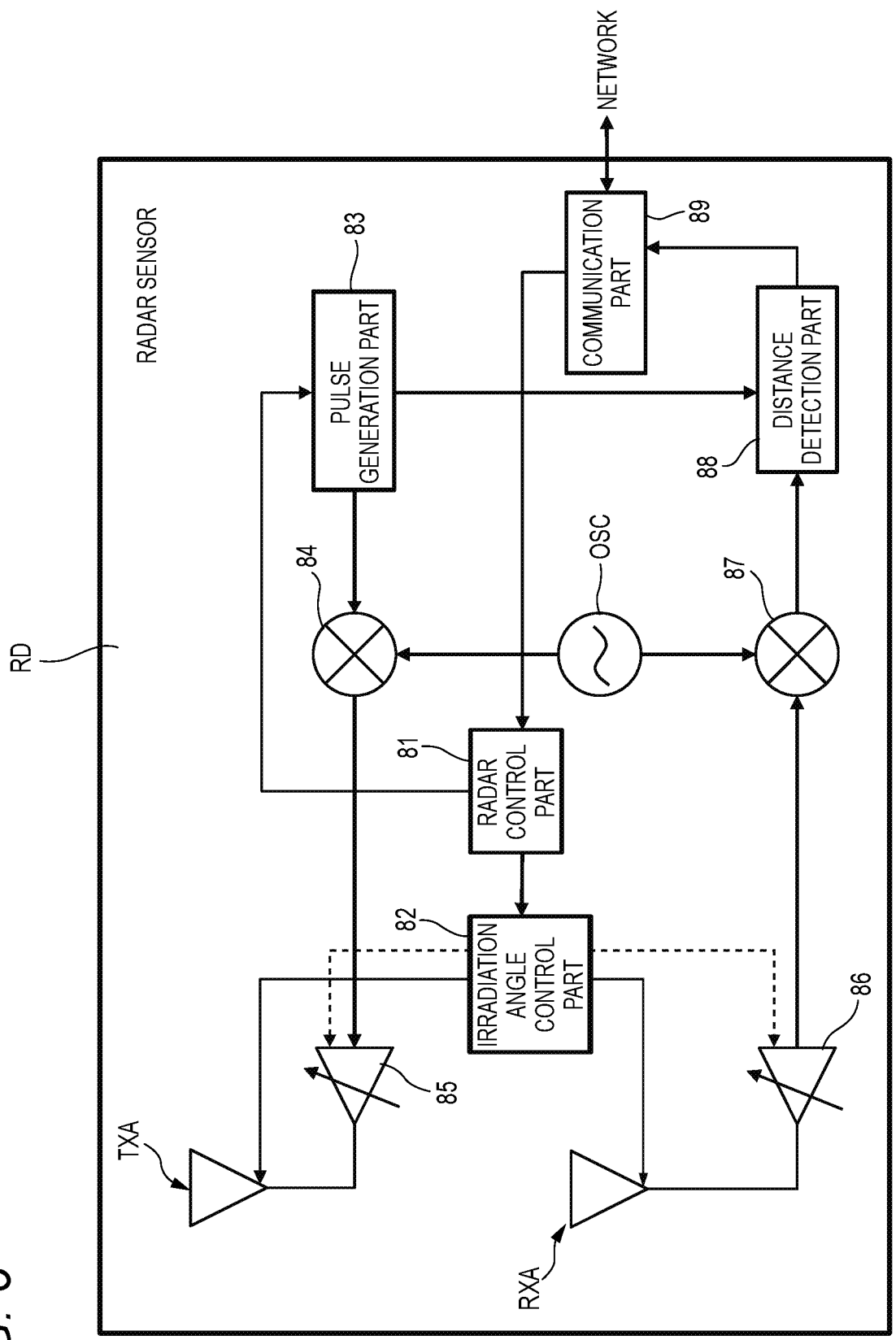
FIG. 6 is a block diagram illustrating an internal configuration example of a radar sensor.

FIG. 6 is a block diagram illustrating an internal configuration example of the radar sensor RD. The radar sensor RD includes a radar control part 81 and an irradiation angle control part 82 as a control part. The radar sensor RD includes a pulse generation part 83, a frequency conversion part 84, a variable amplifier 85, a transmission antenna TXA, and a local oscillator OSC as a transmission part. The radar sensor RD includes a receiving antenna RXA, a variable amplifier 86, a frequency conversion part 87, and a distance detection part 88 as a receiving part. Further, the radar sensor RD includes a communication part 89 capable of communicating data or information with the network NW.

Here, the frequency conversion part 84, the variable amplifier 85, and the transmission antenna TXA are provided as an example of a configuration for achieving a function of a transmission RF (a radio frequency) part. Further, the receiving antenna RXA, the variable amplifier 86, and the frequency conversion part 87 are provided as an example of a configuration for achieving a function of a receiving RF part.

The radar control part 81 controls the operation of each part of the radar sensor RD. For example, when the power is supplied from the power source device (not illustrated) incorporated in the hub housing HUB1, the radar control part 81 transmits the generated detection signal for sensing with respect to the radar detection area RDar (that is, the flying object such as the drone DN, and the like) to the pulse generation part 83. Further, when a radar irradiation angle change instruction (refer to FIG. 20) from the camera control device 1 is received by the communication part 89, the radar control part 81 transmits the radar irradiation angle change instruction to the irradiation angle control part 82.

When the radar irradiation angle change instruction from the radar control part 81 is received, the irradiation angle control part 82 controls the transmission antenna TXA and the receiving antenna RXA, thereby changing an irradiation angle which is currently set to an irradiation angle according to the inputted radar irradiation angle change instruction.

Figure 21:
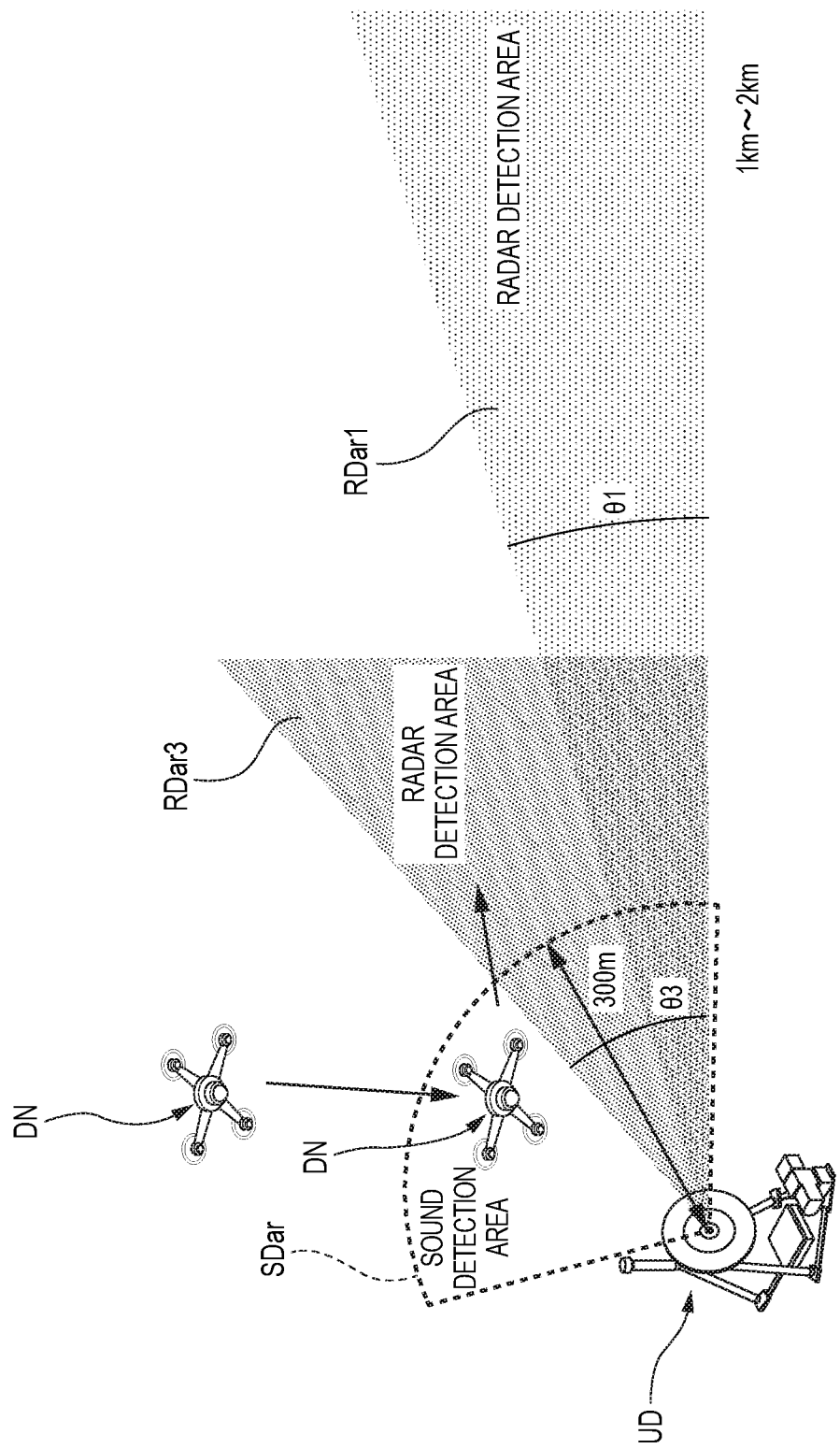
FIG. 21 is an explanatory diagram illustrating a modified example of a radar irradiation angle change at step St22 in FIG. 20.

Further, when receiving the radar irradiation angle change instruction from the radar control part 81, the irradiation angle control part 82 controls the transmission antenna TXA and the variable amplifier 85, so that an output level of the detection signal irradiated from the transmission antenna TXA (in other words, a gain which is an amplification factor in the variable amplifier 85) is narrowed down and an irradiation range (in other words, directivity of the detection signal) is controlled to be widened (refer to FIG. 21). In the same manner, when receiving the radar irradiation angle change instruction from the radar control part 81, the irradiation angle control part 82 controls the receiving antenna RXA and the variable amplifier 86 so as to be synchronized with a control timing of the transmission antenna TXA and the variable amplifier 85, so that a receiving range of a reflection detection signal received by the receiving antenna RXA (in other words, directivity of the detection signal reflected by the drone DN, and the like) is controlled to be widened and an output level of the received reflection detection signal (in other words, a gain which is an amplification factor in the variable amplifier 86) is controlled to be large (refer to FIG. 21).

The pulse generation part 83 is an example of a configuration for achieving a function of a transmission signal generation part. As a transmission signal, a pulse signal (the detection signal) having a predetermined pulse width is repeatedly generated and is outputted at predetermined time intervals. The generated pulse signal is inputted to the frequency conversion part 84. At this time, the pulse generation part 83 outputs a transmission timing signal indicating a generation timing of the pulse signal (a pulse transmission timing) to the distance detection part 88 of the receiving part.

When the pulse signal is used in the transmission signal (the detection signal), a transmission interval thereof represents a measurable distance. In other words, the pulse signal is reflected on an object (for example, the drone DN) having an assumed maximum detection distance (that is, a distance from a position of the radar sensor RD to a terminal position of the radar detection area RDar) after the pulse signal is transmitted from the radar sensor RD, and a longer time (a wider time interval) than a time until the radar sensor RD receives the pulse signal again is defined as the transmission interval of the pulse signal. Further, the pulse width of the transmission pulse is related to resolution at the time of measurement. Here, the shorter the pulse width is, the shorter a distance capable of separating reflected waves from a plurality of objects becomes, thereby achieving the high resolution.

Further, the transmission signal is one which repeatedly transmits a single pulse signal having a predetermined pulse width at a predetermined cycle, but the present invention is not limited thereto as long as an intermittent signal having a predetermined signal width and a predetermined signal interval is adopted according to the range of the distance for detecting the object and the resolution. For example, a pulse signal including a plurality of pulse trains or a modulated signal obtained by frequency modulation or phase modulation of the pulse signal including a single or a plurality of pulse trains, and the like may be used.

The frequency conversion part 84 is configured to include a mixer, and the like. The frequency conversion part 84 mixes the pulse signal generated by the pulse generation part 83 with a local signal outputted from the local oscillator OSC, and then up-converts a pulse signal of a baseband band to a radio frequency. The up-converted pulse signal is inputted to the variable amplifier 85.

Here, the frequency conversion part 84 indicates a configuration in which the pulse signal is up-converted to the radio frequency using the mixer, but the configuration is not limited thereto. For example, a configuration may be adopted in which the pulse signal of the radio frequency is directly oscillated using a step recovery diode.

The variable amplifier 85 can variably adjust a gain according to the signal from the radar control part 81, and amplifies the transmission signal of the radio signal up-converted to the radio frequency. The amplified radio signal (the detection signal) is transmitted from the transmission antenna TXA to the radar detection area RDar of the monitoring area 8. When the flying object such as the drone DN, and the like exists in the radar detection area RDar, a signal transmitted from the transmission antenna TXA of the radar sensor RD is reflected by the flying object and the reflection detection signal which is the reflected wave is received by the receiving antenna RXA. Further, the transmission antenna TXA and the receiving antenna RXA may be shared by one antenna.

The radio signal received by the receiving antenna RXA of the radar sensor RD is inputted to the variable amplifier 86 in a front stage.

The variable amplifier 86 can variably adjust the gain according to the signal from the radar control part 81, and amplifies a receiving signal of the radio signal received by the receiving antenna RXA. The receiving signal includes the reflection detection signal which is the reflected wave from the flying object such as the drone DN, and the like. The receiving signal amplified by the variable amplifier 86 is inputted to the frequency conversion part 87.

The frequency conversion part 87 is configured to include the mixer, and the like. The frequency conversion part 87 mixes an output signal of the variable amplifier 86 with the local signal outputted from the local oscillator OSC, and then down-converts a receiving signal of the radio frequency to the baseband band. The down-converted signal is inputted to the distance detection part 88.

The distance detection part 88 is an example of a configuration for achieving a function of an object detection part. The distance detection part 88 inputs the down-converted receiving signal to the baseband band, performs each processing of detection processing, pulse detection processing and distance detection processing, and calculates the distance up to the flying object such as the drone DN, and the like. Here, the pulse detection processing is processing for detecting a pulse (a receiving pulse) of the reflected wave from the object, and detects a pulse component in the receiving signal using a comparator, and the like.

The distance detection processing is processing for detecting the distance up to the flying object such as the drone DN, and the like in which the reflected wave is generated, and measures a time from when the pulse signal is transmitted to when the receiving pulse of the reflected wave is detected, thereby converting the measured time into the distance. The distance detection part 88 outputs the calculated distance information to the communication part 89. Further, the distance detection part 88 may estimate the direction from the radar sensor RD to the flying object such as the drone DN, and the like (in other words, an arrival direction of the reflection detection signal) by analyzing the reflection detection signal using a well-known technology. The distance detection part 88 may transmit information on the distance up to the flying object such as the drone DN, and the like and the arrival direction (that is, the direction) from the communication part 89 to the monitoring device 10 as a detection result (an example of the distance measurement result) in the radar sensor RD. The communication part 89 is configured with a communication circuit that is connected so that data or information between the radar sensor RD and the monitoring device 10 or the radar sensor RD and the camera control device 1 can be communicated. The communication part 89 receives the radar irradiation angle change instruction transmitted from the camera control device 1, and transmits the detection result (an example of the distance measurement result) in the radar sensor RD to the monitoring device 10 or the camera control device 1.

Figure 7:
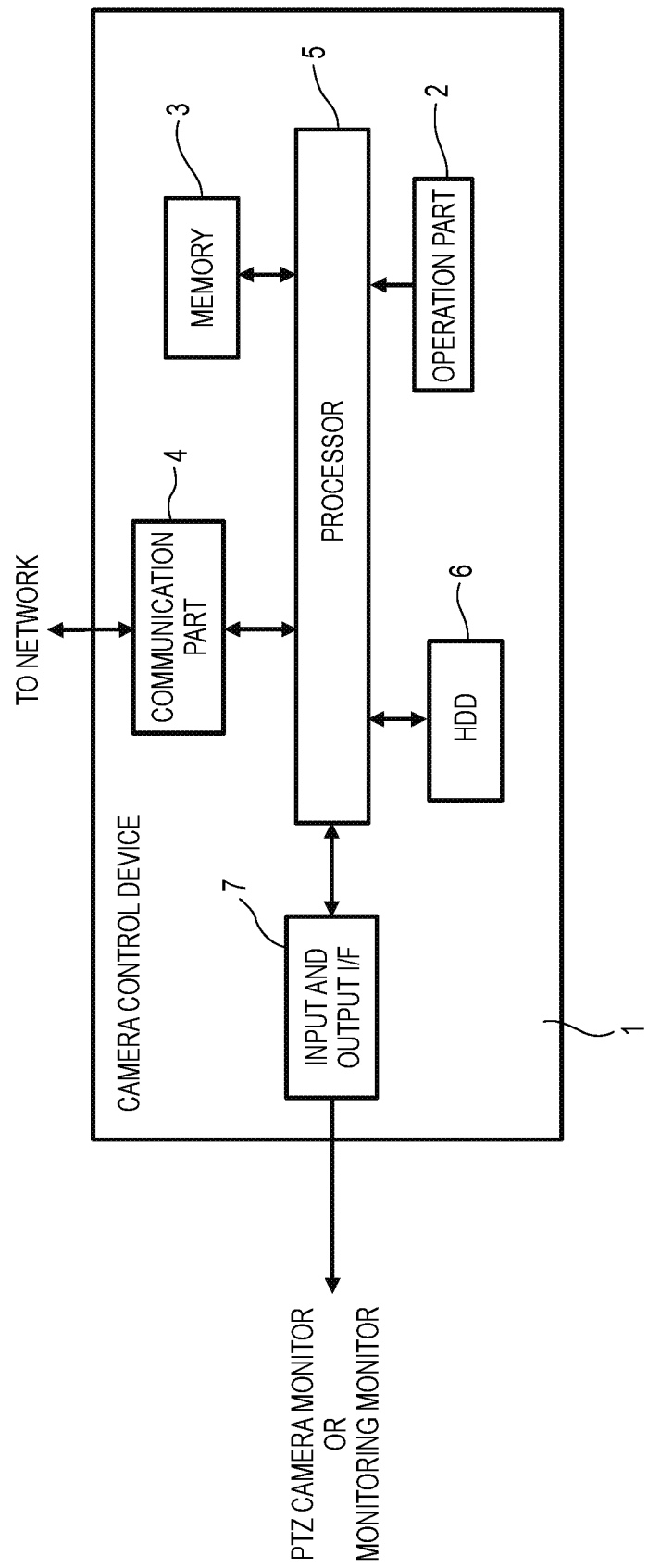
FIG. 7 is a block diagram illustrating an internal configuration example of a camera control device.

FIG. 7 is a block diagram illustrating an internal configuration example of the camera control device 1. The camera control device 1 (an example of a control device) illustrated in FIG. 7 includes a configuration same as that of a computer such as a normal PC, and the like. Specifically, a configuration thereof includes an operation part 2, a memory 3, a communication part 4, a processor 5, an HDD 6, and an input and output I/F 7.

The operation part 2 is a user interface (UI: User Interface) for notifying the processor 5 of contents of an input operation by the user, and is configured with, for example, an input device such as a mouse, a keyboard, and the like. The operation part 2 may be configured using a touch panel or a touch pad that is disposed corresponding to a display screen of the PTZ camera monitor MN3 or the monitoring monitor MN2 and can directly perform an input operation with a user's finger or a stylus pen.

The memory 3 is configured using, for example, a RAM and a ROM, and temporarily stores a program and data required for performing an operation of the camera control device 1, and information or data generated during the operation. The RAM is, for example, a work memory used when operating the processor 5. The ROM stores, for example, a program and data for controlling the processor 5 in advance.

The communication part 4 is configured using a communication circuit that can be connected to the network NW so that the data or information can be communicated therebetween. The communication part 4 transmits, for example, the PTZ control instruction (refer to FIG. 14 or FIG. 20) generated by the processor 5 to the PTZ camera CZ. For example, the communication part 4 receives data of the PTZ captured image transmitted from the PTZ camera CZ, and then transmits the received data to the processor 5.

The processor 5 is configured using, for example, a CPU (central processing unit), a DSP (Digital Signal Processor) or an FPGA (Field Programmable Gate Array), and controls the operation of each part of the camera control device 1. The processor 5 functions as a control part of the camera control device 1, and performs control processing for totally controlling the operation of each part of the camera control device 1, input and output processing of data with each part of the camera control device 1, data calculation (computation) processing, and data storage processing. The processor 5 is operated according to the program and data stored in the memory 3.

The HDD 6 is a recording device for recording data or information acquired or generated by the processor 5, and further data or information received by the communication part 4.

The input and output I/F (Interface) 7 is respectively connected to the monitoring monitor MN2 and/or the PTZ camera monitor MN3 so as to be able to output data or information with respect to the monitoring monitor MN2 and/or the PTZ camera monitor MN3.

Figure 8:
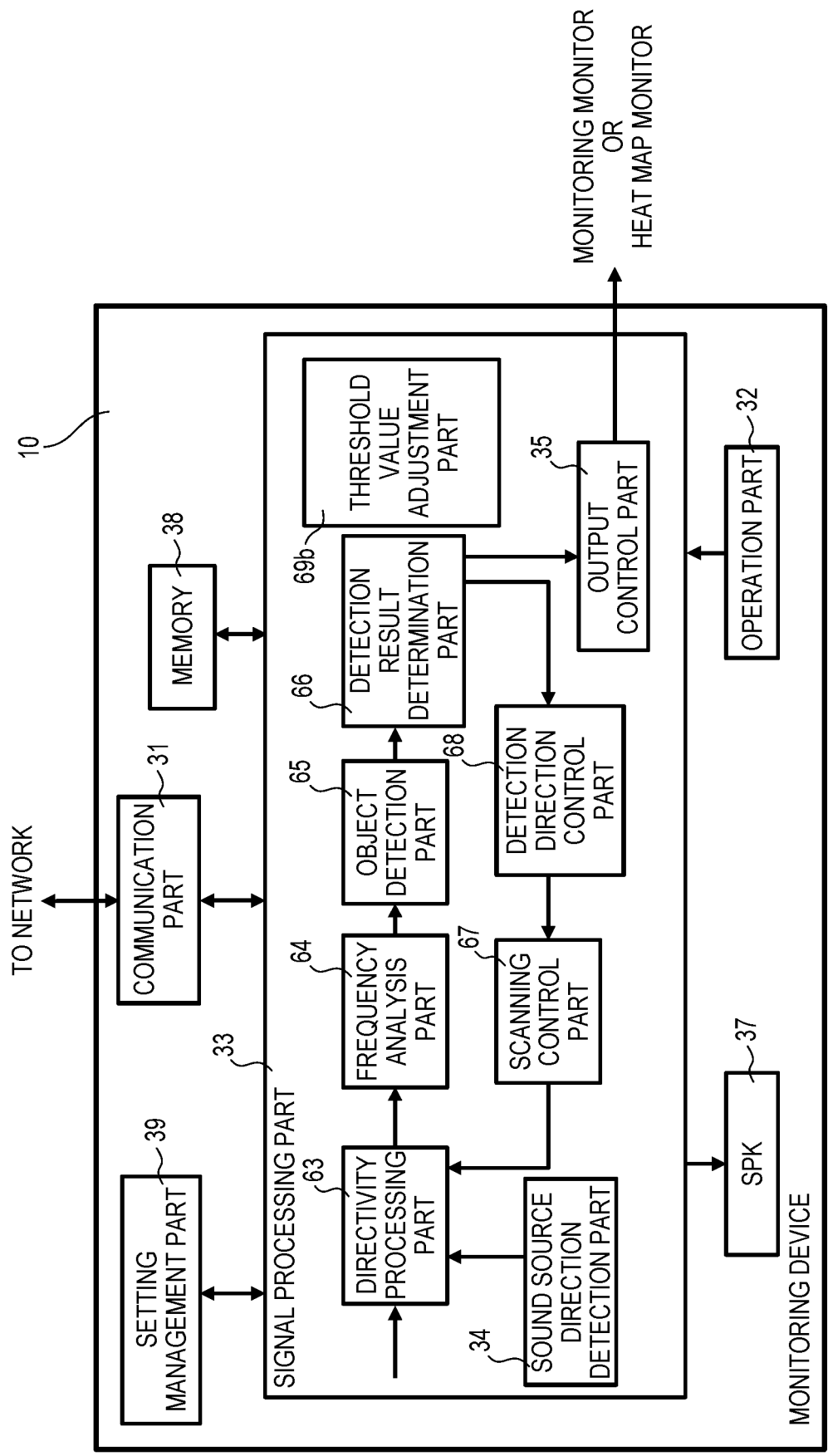
FIG. 8 is a block diagram illustrating an internal configuration example of a monitoring device.

FIG. 8 is a block diagram illustrating an internal configuration example of the monitoring device 10. The monitoring device 10 (an example of the control device) illustrated in FIG. 8 is configured to include at least a communication part 31, an operation part 32, a signal processing part 33, an SPK 37, a memory 38, and a setting management part 39. The SPK stands for a speaker.

The communication part 31 receives the omnidirectional captured image data transmitted by the omnidirectional camera CA and the sound data transmitted by the microphone array MA, and then transmits the omnidirectional captured image data and the sound data to the signal processing part 33.

The operation part 32 is a user interface (UI: User Interface) for notifying the signal processing part 33 of contents of an input operation by the user, and is configured with, for example, an input device such as a mouse, a keyboard, and the like. The operation part 32 may be configured using a touch panel or a touch pad that is disposed corresponding to, for example, a display screen of the monitor MN and can directly perform an input operation by a user's finger or a stylus pen.

When the user designates the vicinity of the marker image MK1 at an approximately center of the sound pressure heat map image HMP1 (refer to FIG. 9) that is superimposed and displayed on the omnidirectional captured image IMG1 of the omnidirectional camera CA on the monitoring monitor MN, the operation part 32 acquires coordinates indicating a designated position and transmits the acquired coordinates to the signal processing part 33. The signal processing part 33 reads out sound data collected by the microphone array MA from the memory 38, and the directivity is formed in a direction toward an actual sound source position corresponding to the designated position from the microphone array MA, and the sound is outputted from the SPK 37. Accordingly, the user is not limited to the drone DN, and can confirm the sound in a state where the sound at the position designated by the user himself or herself on the omnidirectional captured image IMG1 is emphasized.

The signal processing part 33 is configured using a processor such as the CPU (Central Processing Unit), the DSP (Digital Signal Processor) or the FPGA (Field Programmable Gate Array), and the like. The signal processing part 33 (that is, the processor) performs control processing for totally controlling the operation of each part of the monitoring device 10, input and output processing of data with other respective parts, data calculation (calculation) processing and data storage processing. The signal processing part 33 includes a sound source direction detection part 34, an output control part 35, a directivity processing part 63, a frequency analysis part 64, an object detection part 65, a detection result determination part 66, a scanning control part 67, and a detection direction control part 68. Further, the monitoring device 10 is connected to the heat map monitor MN1.

Figure 17:
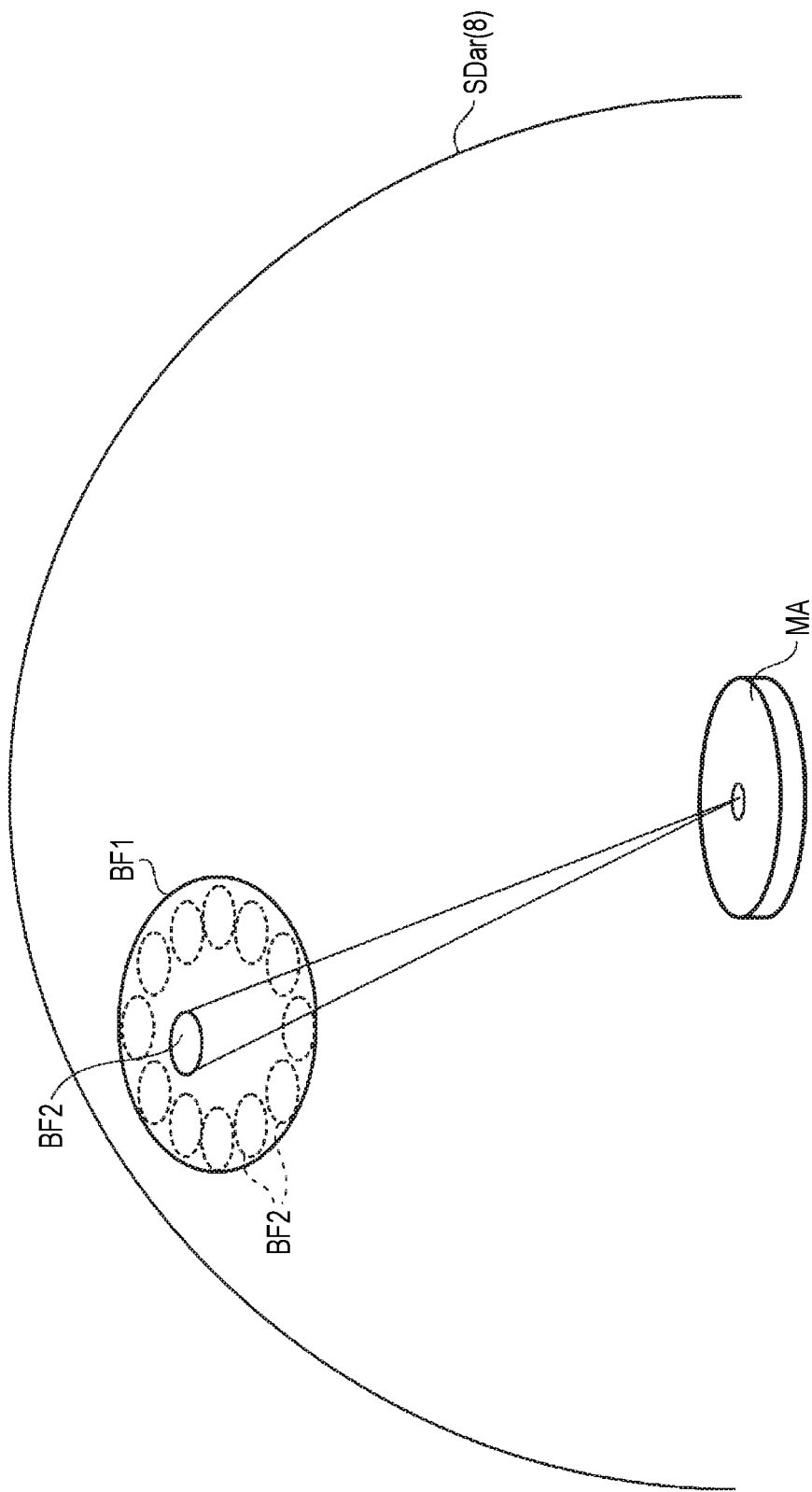
FIG. 17 is a diagram illustrating a sequential scanning example in a directivity direction performed in a sound detection area of a monitoring area when detecting a drone.

The sound source direction detection part 34 estimates the sound source position in the sound detection area SDar (for example, within 200 m to 300 m) of the monitoring area using the sound collected by the microphone array MA according to, for example, a well-known CSP (Cross-Power Spectrum Phase Analysis) method. In the CSP method, when the sound detection area SDar of the monitoring area 8 illustrated in FIG. 17 is divided into a plurality of blocks (refer to descriptions below) and the sound is collected in the sound detection area SDar of the microphone array MA, the sound source direction detection part 34 can schematically estimate the sound source position in the monitoring area 8 by determining whether a sound parameter (for example, a normalized output value of a mutual correlation value between the sound data respectively collected by two microphones that are formed with a plurality of sets among the plurality of microphones M1 to Mq forming the microphone array MA) indicating the magnitude of the sound exceeds a threshold value (a predetermined value) for each block (refer to descriptions below).

Based upon the omnidirectional captured image data captured by the omnidirectional camera CA and the sound data collected by the microphone array MA, the sound source direction detection part 34 calculates the sound parameter (for example, the above-mentioned normalized output value of the mutual correlation value or the sound pressure level) indicating the magnitude of a sound at a position corresponding to the block for each block (for example, indicates a pixel set which is formed by a predetermined number of pixels such as "2*2" pixels, "4*4" pixels, and the like. The same applies hereinafter.) forming the omnidirectional captured image data in the monitoring area 8. The sound source direction detection part 34 transmits a calculation result of the sound parameter for each block forming the omnidirectional captured image data to the output control part 35. The above-mentioned calculation processing of the sound parameter is a well-known technology, and descriptions of the detailed processing will be omitted.

The setting management part 39 holds a coordinate conversion formula relating to coordinate conversion of the position that is designated by the user on the display screen of the monitoring monitor MN on which the omnidirectional captured image data captured by the omnidirectional camera CA are displayed. The coordinate conversion formula is an equation for converting coordinates (that is, a horizontal angle and a vertical angle) of the position designated by the user on the omnidirectional captured image data into coordinates in a direction viewed from the PTZ camera CZ, for example, based upon a physical distance difference between an installation position of the omnidirectional camera CA (refer to FIG. 2) and an installation position of the PTZ camera CZ (refer to FIG. 2).

The signal processing part 33 calculates coordinates ($\theta$MAh, $\theta$MAv) indicating a directivity direction toward the actual sound source position corresponding to the position designated by the user from the installation position of the PTZ camera CZ using the coordinate conversion formula held by the setting management part 39, based upon the installation position of the PTZ camera CZ (refer to FIG. 2). The $\theta$MAh is a horizontal angle in the direction toward the actual sound source position corresponding to the position designated by the user when viewed from the installation position of the PTZ camera CZ. The $\theta$MAv is a vertical angle in the direction toward the actual sound source position corresponding to the position designated by the user when viewed from the installation position of the PTZ camera CZ. The calculation processing of the coordinate conversion formula can be achieved by, for example, a well-known geometric calculation. With respect to the omnidirectional captured image data displayed on the monitoring monitor MN2, the sound source position is the actual sound source position corresponding to the position designated from the operation part 2 by the operation of the user's finger or the stylus pen, and is inputted from the camera control device 1 to the monitor device 10.

Further, as illustrated in FIG. 2, the omnidirectional camera CA and the microphone array MA are respectively disposed so that the optical axis L1 of the omnidirectional camera CA and the center axis of the housing of the microphone array MA are coaxial with each other in the first exemplary embodiment. Therefore, the coordinates of the position designated by the user calculated by the omnidirectional camera CA according to the designation of the user with respect to the monitoring monitor MN2 on which the omnidirectional captured image data are displayed can be regarded as the same as an emphasis direction (also referred to as the directivity direction) of the sound viewed from the microphone array MA. In other words, when there exists the designation of the user with respect to the monitoring monitor MN2 on which the omnidirectional captured image data are displayed, the monitoring device 10 acquires the coordinates of the designated position on the omnidirectional captured image data from the camera control device 1, and then transmits the acquired coordinates to the omnidirectional camera CA. Accordingly, the omnidirectional camera CA calculates the coordinates (the horizontal angle and the vertical angle) indicating the direction of the sound source position, viewed from the omnidirectional camera CA, corresponding to the position designated by the user using the coordinates of the designated position transmitted from the monitoring device 10. Since the calculation processing in the omnidirectional camera CA is a well-known technology, the descriptions thereof will be omitted. The omnidirectional camera CA transmits a calculation result of the coordinates indicating the direction of the sound source position to the monitoring device 10. The monitoring device 10 can use the coordinates (the horizontal angle and the vertical angle) calculated by the omnidirectional camera CA as the coordinates (the horizontal angle and the vertical angle) indicating the direction of the sound source position viewed from the microphone array MA.

However, when the omnidirectional camera CA and the microphone array MA are not coaxially disposed each other, the setting management part 39 is required to convert the coordinates calculated by the omnidirectional camera CA into the coordinates in a direction viewed from the microphone array MA, for example, according to the method described in JP-A-2015-029241.

The setting management part 39 holds a first threshold value, a second threshold value, and a third threshold value which are compared with the sound pressure level of each block forming the omnidirectional captured image data calculated by the sound source direction detection part 34. Here, the sound pressure level is used as an example of the sound parameter indicating the magnitude of the sound generated in the sound detection area SDar of the monitoring area 8 collected by the microphone array MA, and is a concept different from a sound volume indicating a magnitude of the sound outputted from the SPK 37. The first threshold value, the second threshold value, and the third threshold value are threshold values to be compared with the sound pressure level of the sound generated in the sound detection area SDar of the monitoring area 8, and, for example, may be set as threshold values for determining the presence or absence of the sound generated by the drone DN. Further, a plurality of threshold values can be set other than the first threshold value, the second threshold value, and the third threshold value, and only the first threshold value may be used. For a simple description herein, for example, three threshold values are set as follows: the first threshold value, the second threshold value smaller than the first threshold value, and the third threshold value much smaller than the first threshold value (the first threshold value>the second threshold value>the third threshold value).

In the sound pressure heat map image HMP1 generated by the output control part 35, an area of a pixel in which the sound pressure level larger than the first threshold value is obtained is drawn in red. Further, an area of a pixel in which the sound pressure level larger than the second threshold value and equal to or smaller than the first threshold value is obtained is drawn in pink. An area of a pixel in which the sound pressure level that is larger than the third threshold value and is equal to or smaller than the second threshold value is obtained is drawn in blue. Further, an area of a pixel in which the sound pressure level that is equal to or smaller than the third threshold value is obtained is rendered colorless, that is, the area thereof is not changed from a display color of the omnidirectional captured image data.

The SPK 37 is a speaker and outputs the sound data in the monitoring area 8 collected by the microphone array MA or the sound data that is collected by the microphone array MA and has the directivity formed by the signal processing part 33. Further, the SPK 37 may be configured as a device separate from the monitoring device 10.

The memory 38 is configured using, for example, the ROM and the RAM, and holds, for example, various data including the sound data in a certain section, setting information, a program, and the like. Further, the memory 38 also includes a pattern memory (refer to FIG. 15) in which a sound pattern specific to the individual drone DN is registered. Further, the memory 38 stores data of the sound pressure heat map image HMP1 generated by the output control part 35. Further, data of the marker image that schematically indicates the position of the drone DN are registered in the memory 38. The marker image used here is, for example, a star shaped symbol. Further, a mark for identification is not limited to the star shape, but may be a symbol or a character such as a circle, a triangle, a square, a swastika which reminds the drone DN, and the like may be used. Further, a display mode of the marker image may be changed between daytime and nighttime. For example, the display mode thereof may be the star shape during the daytime and may be a square shape not to be mistaken for the star shape during the nighttime. Further, the marker image may be dynamically changed. For example, the star shaped symbol may be displayed in a blinking manner or may be rotated, whereby the user can more pay attention thereto.

Figure 15:
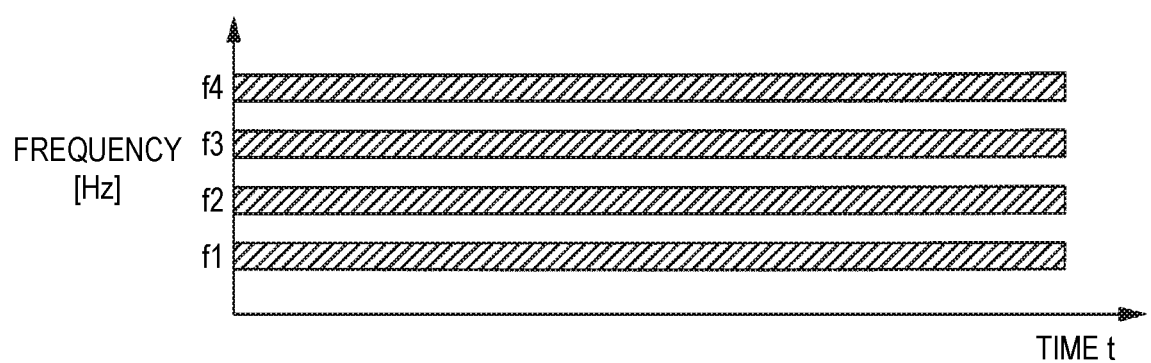
FIG. 15 is a timing chart illustrating an example of a pattern of a detection sound signal of a drone registered in a memory.

FIG. 15 is a timing chart illustrating an example of a pattern of a detection sound signal of the drone DN registered in the memory 38. The pattern of the detection sound signal illustrated in FIG. 15 is a combination of frequency patterns, and includes sounds of four frequencies f1, f2, f3, and f4 generated by rotation of four rotors mounted on the multi-copter type drone DN, and the like. Signals of the respective frequencies are, for example, signals of the frequencies having different sounds generated according to the rotation of a plurality of blades pivotally supported on the respective rotors.

In FIG. 15, an area of the frequency indicated by an oblique line is an area having a high sound pressure level. Further, the pattern of the detection sound may include not only the number of sounds of a plurality of frequencies and the sound pressure levels but also other pieces of sound information. For example, a sound pressure level ratio representing a ratio of the sound pressure level of each frequency, and the like can be described. In this case, as an example, the detection of the drone DN is determined depending on whether the sound pressure level of each frequency included in the pattern of the detection sound exceeds the threshold value.

The directivity processing part 63 performs the above-mentioned directivity forming processing (beamforming) using the sound data signals collected by the non-directional microphones M1 to Mq, and performs processing of extracting a sound data signal whose directivity direction is a direction of the sound detection area SDar of the monitoring area 8. Further, the directivity processing part 63 can also perform processing of extracting a sound data signal whose directional range is a range of the sound detection area SDar of the monitoring area 8. Here, the directional range is a range including a plurality of adjacent directivity directions, and when compared with the directivity direction, the directional range is intended to include a spread of the directivity direction to some extent.

The frequency analysis part 64 performs frequency analysis processing with respect to the sound data signal extracted and processed in the directivity direction by the directivity processing part 63. In the frequency analysis processing, the frequency included in the sound data signal in the directivity direction and the sound pressure level included therein are detected.

Figure 16:
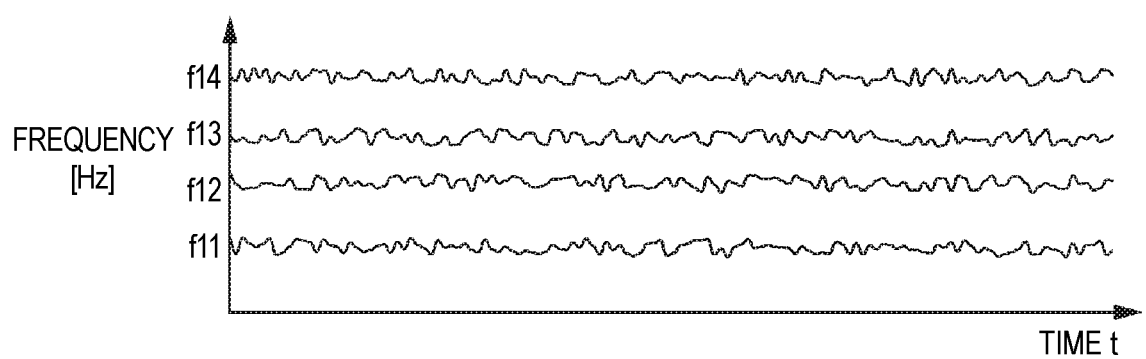
FIG. 16 is a timing chart illustrating an example of a frequency change of a detection sound signal obtained as a result of frequency analysis processing.

FIG. 16 is a timing chart illustrating an example of a frequency change of a detection sound signal obtained as a result of the frequency analysis processing. In FIG. 16, four frequencies f11, f12, f13, and f14 and a sound pressure level of each frequency are obtained as the detection sound signal (that is, a detection sound data signal). In the drawing, fluctuation of each frequency irregularly changing is caused by, for example, rotation fluctuation of the rotor (the rotary blade) which slightly changes when the drone DN controls an attitude of the drone DN itself.

The object detection part 65 performs detection processing of the drone DN using the frequency analysis processing result of the frequency analysis part 64. Specifically, in the detection processing of the drone DN, the object detection part 65 compares a pattern of the detection sound (refer to the frequencies f11 to f14 illustrated in FIG. 16) obtained as the result of frequency analysis processing with a pattern of the detection sound (refer to the frequencies f1 to f4 illustrated in FIG. 15) registered in the pattern memory of the memory 38 in advance in the sound detection area SDar of the monitoring area 8. The object detection part 65 determines whether the patterns of the detection sounds of the both are approximate to each other.

For example, whether the patterns of the both are approximate to each other is determined as follows. When the sound pressure of at least two frequencies included in the detection sound data among the four frequencies f1, f2, f3, and f4 exceeds the threshold value (for example, the first threshold value described above), the object detection part 65 detects the drone DN on the assumption that the sound patterns are approximate to each other. Further, the drone DN may be detected when other conditions are satisfied.

When it is determined that the drone DN does not exist, the detection result determination part 66 instructs the detection direction control part 68 to shift to the detection of the drone DN in the next directivity direction in the sound detection area SDar. When it is determined that the drone DN exists as a result of scanning in the directivity direction, the detection result determination part 66 notifies the output control part 35 of a detection result of the drone DN. Further, the detection result thereof includes information of the detected drone DN. The information of the drone DN includes, for example, identification information of the drone DN and position information (for example, height information and direction information) of the drone DN in the sound detection area SDar of the monitoring area 8.

The detection direction control part 68 controls a direction for detecting the drone DN in the sound detection area SDar based upon the instruction from the detection result determination part 66. For example, the detection direction control part 68 sets an arbitrary direction of a directional range BF1 (refer to FIG. 17) including the sound source position estimated by the sound source direction detection part 34 as a detection direction in the sound detection area SDar of the monitoring area 8.

The scanning control part 67 instructs the directivity processing part 63 to perform beamforming on the detection direction set by the detection direction control part 68 as the directivity direction.

The directivity processing part 63 performs the beamforming on the directivity direction instructed from the scanning control part 67. Further, in the initial setting, the directivity processing part 63 sets an initial position in the directional range BF1 (refer to FIG. 17) including the sound source position estimated by the sound source direction detection part 34 as a directivity direction BF2. The directivity direction BF2 is sequentially set by the detection direction control part 68 in the directional range BF1.

The output control part 35 controls each operation of the heat map monitor MN1 and the SPK 37, and outputs a display instruction to the monitoring monitor MN2 with respect to the omnidirectional captured image data transmitted from the omnidirectional camera CA to the camera control device 1. The camera control device 1 displays the omnidirectional captured image data transmitted from the omnidirectional camera CA on the monitoring monitor MN2 according to the display instruction.

The output control part 35 outputs the sound data transmitted from the microphone array MA to the SPK 37 by voice. When the drone DN is detected, the output control part 35 outputs the marker image MK1 (refer to FIG. 9) indicating the drone DN to the heat map monitor M1 so as to superimpose and display the marker image MK1 on the corresponding position of the sound pressure heat map image HMP1 (that is, coordinates indicating the position of the drone DN). Further, when the drone DN is detected, the output control part 35 outputs a display instruction for superimposing and displaying the marker image MK1 (refer to FIG. 10) indicating the drone DN on the corresponding position of the omnidirectional captured image IMG1 (that is, the coordinates indicating the position of the drone DN) to the camera control device 1 connected to the monitoring monitor MN2. As described above, according to the display instruction from the monitoring device 10, the camera control device 1 can superimpose and display the marker image MK1 (refer to FIG. 10) indicating the drone DN on the corresponding position of the omnidirectional captured image IMG1 (that is, the coordinates indicating the position of the drone DN) (refer to FIG. 10).

The output control part 35 performs emphasis processing on the sound data of the directivity direction by performing the directivity forming processing of the sound data collected by the microphone array MA using the sound data collected by the microphone array MA and the coordinates indicating the direction of the sound source position derived by the omnidirectional camera CA. The directivity forming processing of the sound data is, for example, a well-known technology described in JP-A-2015-029241.

The output control part 35 generates a sound pressure map in which a calculation value of the sound pressure level is allocated to a position of a corresponding block for each block forming the omnidirectional captured image data using the sound pressure level of each block forming the omnidirectional captured image data calculated by the sound source direction detection part 34. Further, in order for the user to visually and easily distinguish the sound pressure map, the output control part 35 generates the sound pressure heat map image illustrated in FIG. 9 by performing color conversion processing by which the sound pressure level of each block of the generated sound pressure map is converted into a visual image (for example, a colored image).

Further, as described above, the output control part 35 generates the sound pressure map or the sound pressure heat map in which the sound pressure level calculated in a block unit is allocated to the position of the corresponding block, however, alternatively, the sound pressure level may be calculated for each pixel, and the sound pressure map or the sound pressure heat map image in which the sound pressure level for each pixel is allocated to the position of the corresponding pixel may be generated.

Figure 12:
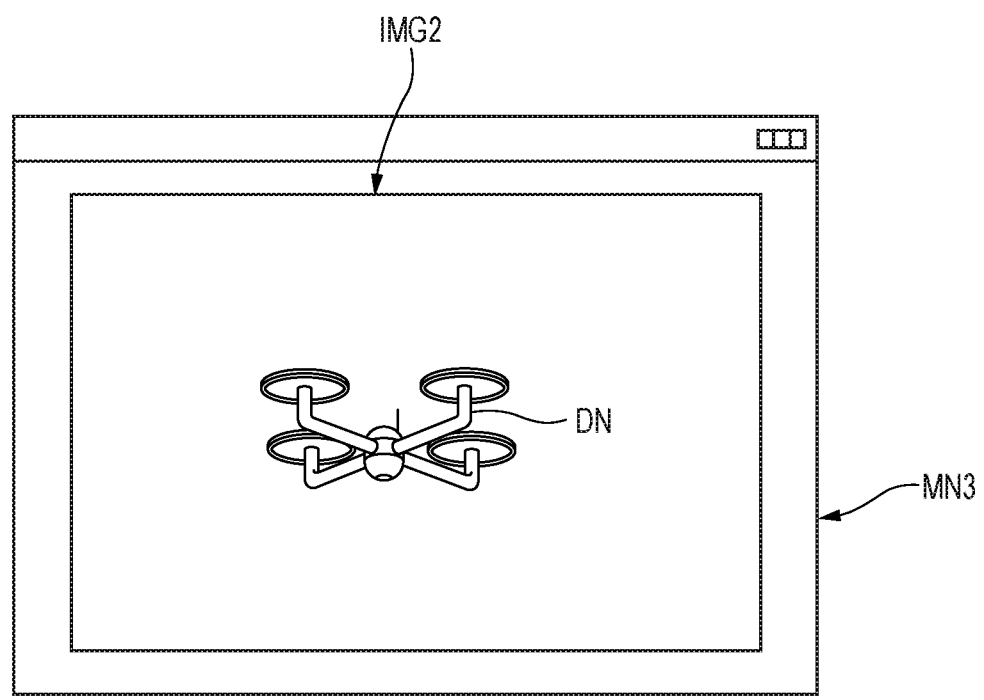
FIG. 12 is a diagram illustrating a display example of a PTZ captured image displayed on a PTZ camera monitor.

FIG. 9 is a diagram illustrating a display example of the sound pressure heat map image HMP1 displayed on the heat map monitor MN1. FIG. 10 is a diagram illustrating a display example of a monitoring image screen displayed on the monitoring monitor MN2. FIG. 11 is a diagram illustrating a display example of a map display screen displayed on the monitoring monitor MN2. FIG. 12 is a diagram illustrating a display example of the PTZ captured image IMG2 displayed on the PTZ camera monitor MN3.

As illustrated in FIG. 9, the sound pressure heat map image HMP1 that is generated by the monitoring device 10 and displayed on the heat map monitor MN1 is the image colored according to the comparison between the sound pressure level calculated for each block (refer to the above-mentioned descriptions) that is formed with a set of predetermined number of pixels forming the omnidirectional captured image IMG1 captured by the omnidirectional camera CA and a plurality of different threshold values that are set stepwise (refer to the above-mentioned descriptions). The heat map monitor MN1 illustrated in FIG. 9 indicates that the marker image MK1 for indicating that the drone DN is detected is superimposed on an approximately center portion of the sound pressure heat map image HMP1, and the sound pressure level in the vicinity of the marker image MK1 is high. Further, generated date information DT1 of the sound pressure heat map image HMP1 may be displayed on the heat map monitor MN1.

As illustrated in FIG. 10, the monitoring image screen displayed on the monitoring monitor MN2 by the camera control device 1 includes a display area AR1 in which the omnidirectional captured image IMG1 of the omnidirectional camera CA is displayed; a display area AR2 in which a button or an icon capable of operating and setting each parameter of the omnidirectional camera CA or the PTZ camera CZ is displayed; and a display area AR3 of information relating to the detection result of the flying object such as the detected drone DN, and the like. Each parameter of the omnidirectional camera CA is, for example, an optical zoom magnification, an electronic zoom magnification, adjustment of focus, adjustment of iris (diaphragm), control of ON/OFF of illumination, control of ON/OFF of operation of a wiper (not illustrated) provided in the PTZ camera, acquisition or release of control rights, and the like. On the monitoring monitor MN2 illustrated in FIG. 10, the marker image MK1 for indicating that the drone DN is detected is superimposed on the approximately center part of the omnidirectional captured image IMG1. Accordingly, the user can visually grasp the position of the flying object such as the drone DN, and the like while viewing the real-time omnidirectional captured image IMG1 on the monitoring monitor MN2. Further, the generated date information DT1 of the omnidirectional captured image IMG1 may be displayed on the monitoring monitor MN2.

As illustrated in FIG. 11, the map display screen displayed on the monitoring monitor MN2 by the camera control device 1 includes the display area AR1 of the map MP1 displayed by switching the omnidirectional captured image IMG1 of the omnidirectional camera CA according to the operation of the camera control device 1 by the user; the display area AR2 in which the button or the icon capable of operating and setting each parameter of the omnidirectional camera CA or the PTZ camera CZ is displayed; and the display area AR3 of the information relating to the detection result of the flying object such as the detected drone DN, and the like. Since the contents of the display areas AR2 and AR3 are described with reference to FIG. 10, the descriptions thereof will be omitted herein. The camera control device 1 holds position information of a place where the sound source detection unit UD is disposed, and superimposes an image MK2 (a photograph) such as a thumbnail, and the like of the sound source detection unit UD on the map MP1, thereby displaying the superimposed image thereon. Further, for example, when the drone DN in flight in the sound detection area SDar and the radar detection area RDar is detected, the camera control device 1 superimposes information on a distance Di from the arrangement place of the sound source detection unit UD to the drone DN and an image DNic such as the thumbnail of the drone DN, and the like on the map MP1, thereby displaying the superimposed information thereon. Accordingly, the user can easily and apparently grasp the position on the map MP1 where the drone DN is detected on the monitoring monitor MN2, and can accurately take countermeasures such as a necessary initial action, and the like, thereby improving the convenience of the user.

As illustrated in FIG. 12, the PTZ captured image IMG2 displayed on the PTZ camera monitor MN3 by the camera control device 1 is an image that is captured by the PTZ camera CZ according to the PTZ control instruction from the camera control device 1 after it is determined that the drone DN is detected by the processing of the radar sensor RD or the monitoring device 10. That is, since the PTZ captured image IMG2 is the image that is captured after the PTZ camera CZ appropriately adjusts the optical axis direction and the zoom magnification according to the PTZ control instruction, an appearance of the drone DN is shown in an easily understandable manner. Thus, the user can easily grasp the appearance and structural characteristics of the drone DN detected in the radar detection area RDar and the sound detection area SDar of the monitoring area 8 or both overlapping area thereof, a load of the drone DN, and the like on the PTZ camera monitor MN3.

Next, a first operation procedure of the flying object detection system 100 according to the first exemplary embodiment will be described in detail with reference to FIGS. 13 to 18.

Figure 13:
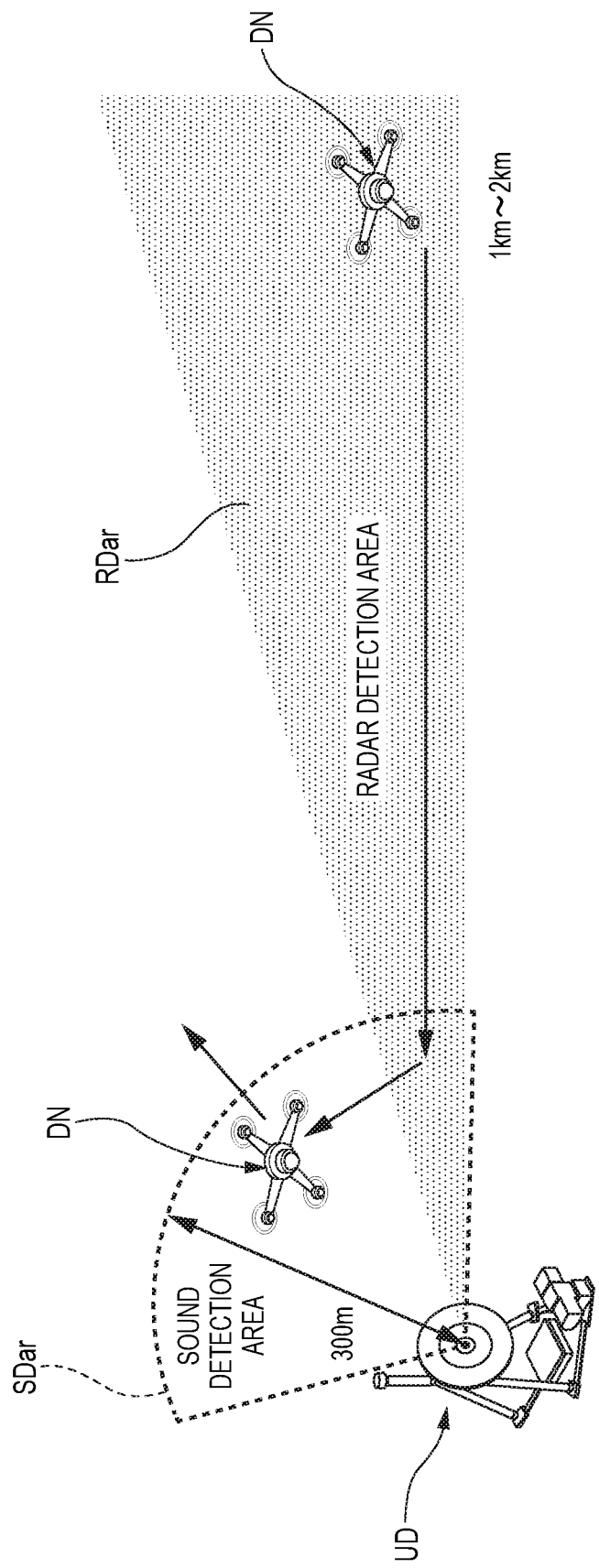
FIG. 13 is a diagram illustrating a movement example of a drone that is detected in the order of a radar detection area and a sound detection area.
Figure 14:
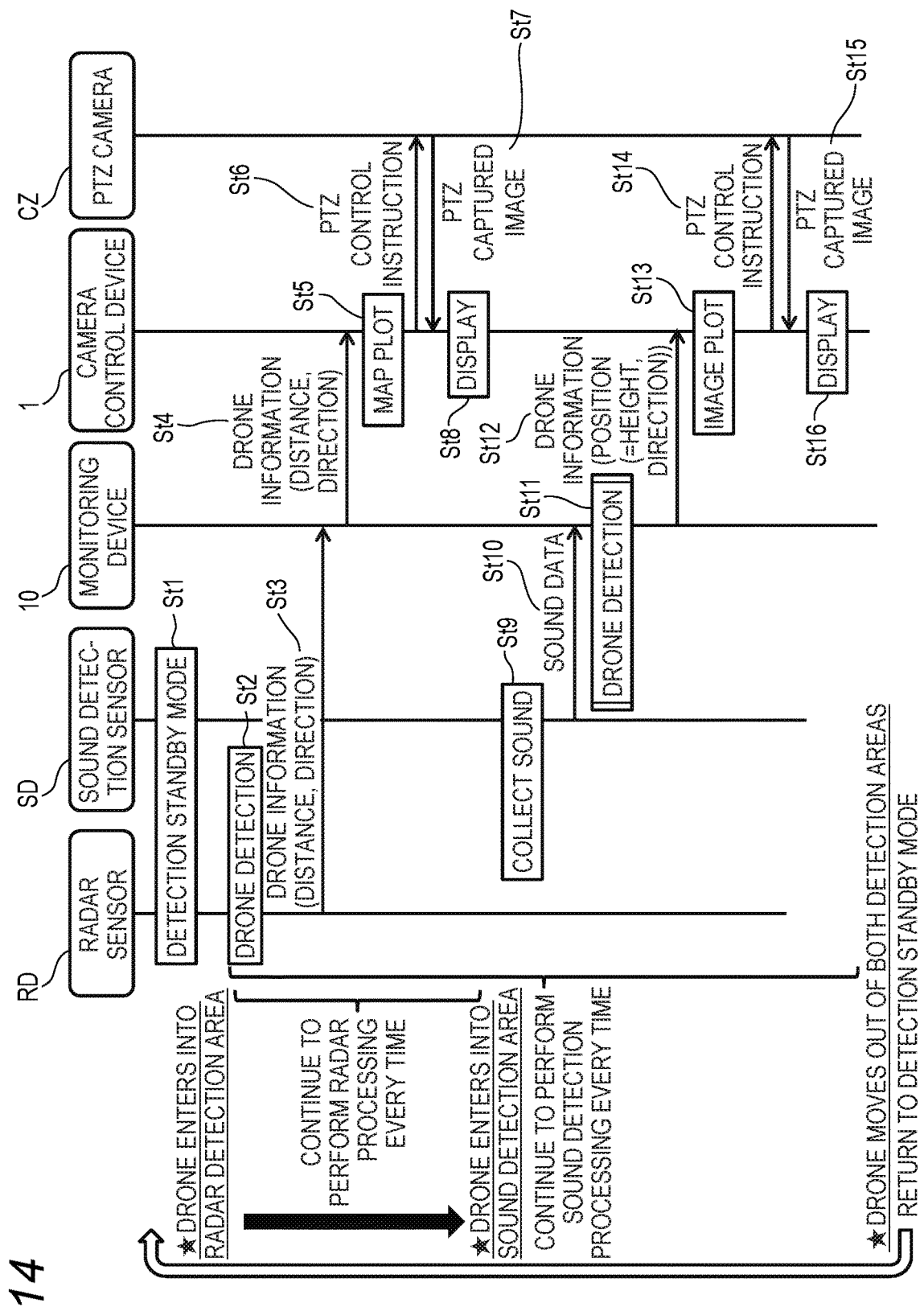
FIG. 14 is a sequence diagram illustrating an example of a first operation procedure of a flying object detection system according to detection processing of a drone moving in a flight route in FIG. 13.
Figure 18:
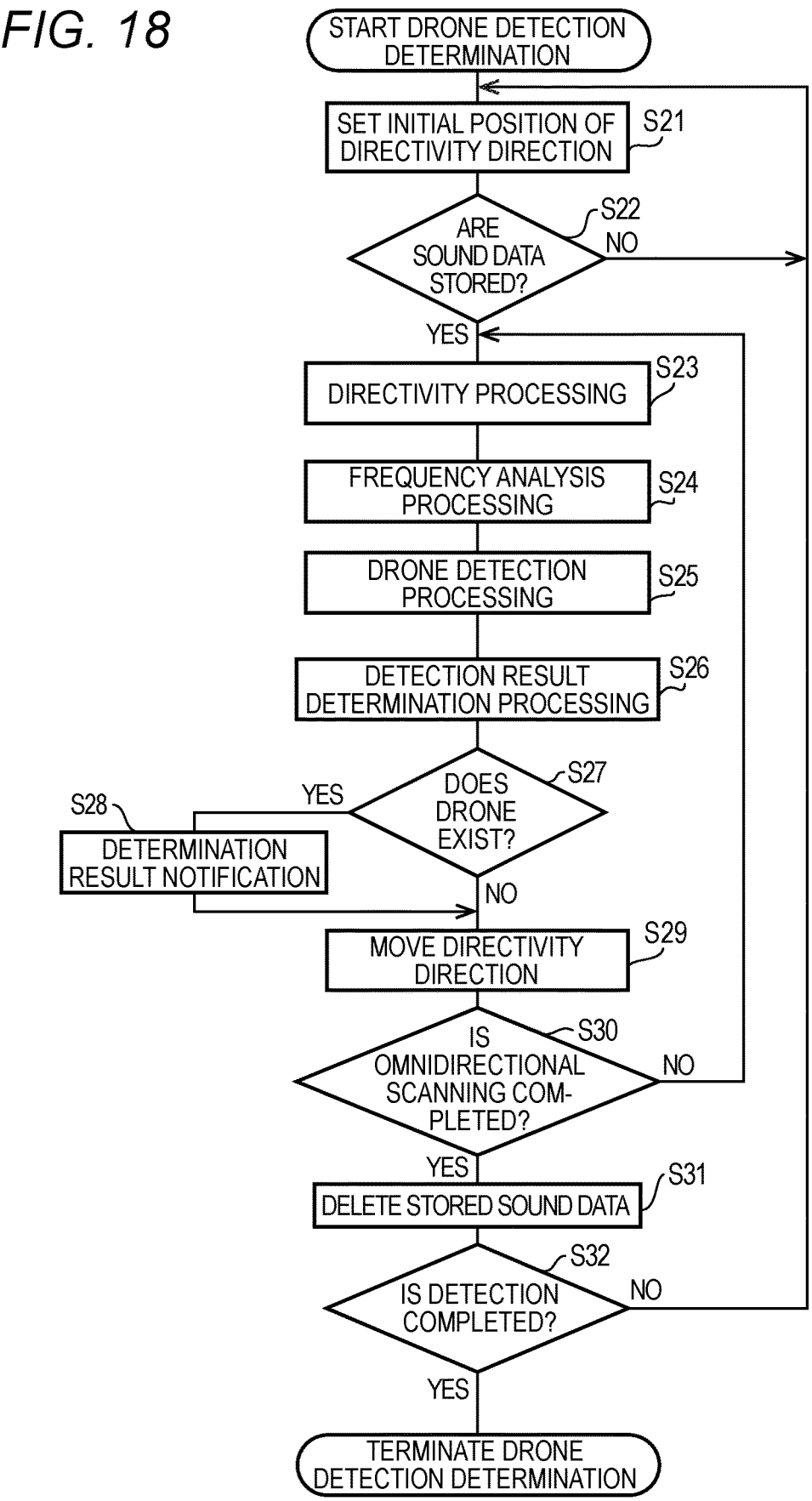
FIG. 18 is a flow chart illustrating an operation procedure example of detection and determination processing of the drone at step St11 in FIG. 14.

FIG. 13 is a diagram illustrating a movement example of the drone DN that is detected in the order of the radar detection area RDar and the sound detection area SDar. FIG. 14 is a sequence diagram illustrating an example of the first operation procedure of the flying object detection system 100 according to the detection processing of the drone DN moving in a flight route in FIG. 13. FIG. 17 is a diagram illustrating a sequential scanning example in the directivity direction performed in the sound detection area SDar of the monitoring area 8 when detecting the drone. FIG. 18 is a flow chart illustrating an operation procedure example of detection and determination processing of the drone at step St11 in FIG. 14.

In the first operation procedure, the radar detection area RDar includes an area that is separated from the arrangement place of the radar sensor RD by about 1 km to 2 km (as an example) in a direction of a range of a predetermined irradiation angle θ1 from the ground including the arrangement place of the radar sensor RD of the sound source detection unit UD. On the other hand, the sound detection area SDar includes an area that is separated from the arrangement place thereof by about 300 m (as an example) in a horizontal direction and a vertical direction toward which the arrangement place of the radar sensor RD of the sound source detection unit UD (for example, a sound collected surface of the sound of the microphone array MA) is directed.

As illustrated in FIG. 13, in the first operation procedure of the flying object detection system 100, it is assumed that as an example, the drone DN is flying and moving so as to approach the sound source detection unit UD from the remote area when viewed from the arrangement place of the sound source detection unit UD. Specifically, the drone DN is first detected by the radar sensor RD in the radar detection area RDar, and then the drone DN moves by flying and is detected by the monitoring device 10 in the sound detection area SDar, after which the drone DN moves by flying and moves to the outside of the range of the radar detection area RDar and the sound detection area SDar.

In FIG. 14, when the drone DN is not detected by one of the radar sensor RD and the monitoring device 10, the monitoring device 10 is in a detection standby mode state (SU).

At the time of the step St1, it is assumed that the drone DN enters into the remote area (for example, within the radar detection area RDar of the monitoring area 8) when viewed from the arrangement place of the sound source detection unit UD (refer to FIG. 13).

In this case, the drone DN is detected by the radar sensor RD (St2), and the radar sensor RD transmits drone information (for example, a distance and a direction from the displacement place of the radar sensor RD to the drone DN) as a detection output of the drone DN to the monitoring device 10 via the network NW (St3). The direction of the drone DN is, for example, the direction in which a detection signal (that is, a reflection detection signal) reflected by the drone DN arrives when viewed from the radar sensor RD.

The monitoring device 10 receives and acquires the drone information transmitted from the radar sensor RD, and transmits the drone information to the camera control device 1 (St4).

The camera control device 1 displays, for example, the map MP1 of the monitoring area 8 in the display area AR1 of the monitoring monitor MN2, and the image Dnic such as the thumbnail of the drone DN, and the like is plotted (displayed) on the map MP1 (for example, a two-dimensional map, refer to FIG. 11) (St5) using the drone information (for example, the distance and the direction) transmitted from the monitoring device 10 at the step St4. Further, the camera control device 1 calculates the optical axis direction and the zoom magnification capable of imaging the drone DN in the PTZ camera CZ using the drone information (for example, the distance and the direction) transmitted from the monitor device 10 at step St4, thereby generating the PTZ control instruction including the calculation result. The camera control device 1 transmits the generated PTZ control instruction to the PTZ camera CZ via the network NW (St6).

The PTZ camera CZ changes at least one of the optical axis direction and the zoom magnification according to the PTZ control instruction transmitted from the camera control device 1 at the step St6, after which the drone DN is imaged by the PTZ camera CZ according to the changed optical axis direction and the changed zoom magnification. The PTZ camera CZ transmits the image (the PTZ captured image) of the captured drone DN to the camera control device 1 via the network NW (St7). The camera control device 1 displays the PTZ captured image IMG2 (refer to FIG. 12) transmitted from the PTZ camera CZ at the step St7 on the PTZ camera monitor MN3 (St8).

Further, the radar sensor RD does not perform the detection processing of the drone DN at step St2 illustrated in FIG. 14 only once, but continues to perform the detection processing of the drone DN at step St2 every time (in other words, the detection processing is repeated). Therefore, the radar sensor RD can detect the drone DN while the drone DN exists in the radar detection area RDar, however, when the drone DN is deviated from the radar detection area RDar (that is, the drone DN moves by flying, and does not exist in the radar detection area RDar), the drone DN cannot be detected.

Next, after the step St8, it is assumed that the drone DN enters into the overlapping area between the radar detection area RDar and the sound detection area SDar from the radar detection area RDar of the monitoring area 8, and then enters into the sound detection area SDar (refer to FIG. 13).

When the drone DN enters into the sound detection area SDar, the sound generated by the drone DN is collected by the microphone array MA of the sound detection sensor SD (St9). The sound data collected by the microphone array MA are transmitted to the monitoring device 10 (St10). The monitoring device 10 detects the presence or absence of the drone DN using the sound data collected by the microphone array MA according to a method illustrated in FIGS. 17 and 18 (St11).

Here, details of the step St11 will be described with reference to FIGS. 17 and 18.

In the sound source detection unit UD, the directivity processing part 63 sets, for example, the directional range BF1 based upon the sound source position estimated by the sound source direction detection part 34 as an initial position of the directivity direction BF2 (S21). Further, the initial position thereof may not be limited to the directional range BF1 based upon the sound source position in the sound detection area SDar of the monitoring area 8 estimated by the sound source direction detection part 34. That is, an arbitrary position designated by the user may be set as the initial position, and the sound detection area SDar of the monitoring area 8 may be sequentially scanned. Since the initial position thereof is not limited, even when the sound source included in the directional range BF1 based upon the estimated sound source position is not the drone DN, the drone flying in another directivity direction can be detected at an early stage.

The directivity processing part 63 determines whether the sound data signal collected by the microphone array MA and converted into a digital value by the A/D converters An1 to Aq is temporarily stored in the memory 38 (S22). When the sound data signal is not stored in the memory (NO in S22), the processing of the directivity processing part 63 returns to the step S21.

When the sound data signal collected by the microphone array MA is temporarily stored in the memory 38 (YES in S22), the directivity processing part 63 performs the beamforming on the arbitrary directivity direction BF2 in the directional range BF1 within the sound detection area SDar of the monitoring area 8, and then performs the processing of extracting the sound data signal of the directivity direction BF2 (S23).

The frequency analysis part 64 detects the frequency of the extracted sound data signal and the sound pressure level thereof (S24).

The object detection part 65 compares the pattern of the detection sound registered in the pattern memory of the memory 38 with the pattern of the detection sound obtained as the result of the frequency analysis processing, and then performs the detection of the drone DN (S25).

The detection result determination part 66 notifies the output control part 35 of the comparison result, and also notifies the detection direction control part 68 of transition of the detection direction (S26).

For example, the object detection part 65 compares the pattern of the detection sound obtained as the result of frequency analysis processing with the four frequencies f1, f2, f3, and f4 registered in the pattern memory of the memory 38. As a result of the comparison, the object detection part 65 includes at least two same frequencies in the patterns of both detection sounds, and when the sound pressure level of these frequencies is larger than the first threshold value, the patterns of the both detection sounds are approximate to each other, and it is determined that the drone DN exists.

Further, here, it is assumed that at least two frequencies coincide with each other, however when one frequency coincides therewith and the sound pressure level of the frequency is larger than the first threshold value, the object detection part 65 may determine that the patterns thereof are approximate to each other.

Further, the object detection part 65 sets an allowable frequency error with respect to each frequency, and may determine the presence or absence of the approximation on the assumption that the frequencies existing within an allowable error range is the same frequency.

Further, the object detection part 65 may perform determination by adding a determination condition that sound pressure level ratios of the sounds of the respective frequencies approximately coincide with each other in addition to the comparison between the frequency and the sound pressure level. In this case, since the determination condition becomes strict, the sound source detection unit UD easily specifies the detected drone DN as an object registered in advance, thereby improving the detection accuracy of the drone DN.

As a result of the step S26, the detection result determination part 66 determines whether the drone DN exists (S27).

When the drone DN exists (YES in S27), the detection result determination part 66 notifies the output control part 35 of a fact that the drone DN exists in (that is, the detection result of the drone DN) and the information indicating the position thereof (for example, the direction of the drone DN and the height thereof when viewed from the arrangement place of the sound source detection unit UD) (S28).

On the other hand, when the drone DN does not exist (NO in S27), the detection result determination part 66 instructs the scanning control part 67 to move the directivity direction BF2 of a scanning object in the monitoring area 8 to the next different direction. The scanning control part 67 moves the directivity direction BF2 of the scanning object in the sound detection area SDar of the monitoring area 8 to the next different direction according to the instruction from the detection result determination part 66 (S29). Further, the notification of the detection result of the drone DN may be collectively performed after omnidirectional scanning is completed, rather than at the timing when the detection processing of one directivity direction is completed.

Further, the order of sequentially moving the directivity direction BF2 in the monitoring area 8 may be, for example, a spiral-shaped (swirl-shaped) order in which the directivity direction BF2 moves from an outer circumference toward an inner circumference or from the inner circumference to the outer circumference within the directional range BF1 in the sound detection area SDar of the monitoring area 8 or within the whole range.

Further, the detection direction control part 68 does not scan the directivity direction consecutively as that of a single stroke. A position may be set in advance in the sound detection area SDar of the monitoring area 8, and the directivity direction BF2 may be moved to each position in an arbitrary order. Accordingly, for example, the monitoring device 10 can start the detection processing from a position where the drone DN is easy to enter, whereby the detection processing can be efficient.

The scanning control part 67 determines whether the omnidirectional scanning in the sound detection area SDar of the monitoring area 8 is completed (S30). When the omnidirectional scanning is not completed (NO in S30), the processing of the signal processing part 33 returns to the step S23, and the processing from steps S23 to S30 is repeated. That is, the directivity processing part 63 performs the beamforming on the directivity direction BF2 of the position moved to the step S29, and then performs the processing of extracting the sound data of the directivity direction BF2. Accordingly, even when one drone DN is detected, since the sound source detection unit UD continues to detect the drone having the possibility of existence elsewhere, it is possible to detect the plurality of drones.

On the other hand, when the omnidirectional scanning is completed at the step S30 (YES in S30), the directivity processing part 63 deletes the sound data that is temporarily stored in the memory 38 and collected by the microphone array MA at step S31. Further, the directivity processing part 63 may delete the sound data collected by the microphone array MA from the memory 38.

After deleting the sound data, the signal processing part 33 determines whether the detection processing of the drone DN is completed (S32). The termination of the detection processing of the drone DN is performed according to a predetermined event. For example, the number of times when the drone DN is not detected at the step S26 is held in the memory 38, and when the number of times becomes equal to or more than the predetermined number, the detection processing of the drone DN may be terminated. Further, the signal processing part 33 may also terminate the detection processing of the drone DN based upon the time-up by a timer and the user operation with respect to the UI (User Interface) (not illustrated) provided in the operation part 32. Further, when the power supply of the monitoring device 10 is turned off, the detection processing thereof may be terminated.

Further, in the processing of the step S24, the frequency analysis part 64 analyzes the frequency, and also measures the sound pressure of the frequency. When the sound pressure level measured by the frequency analysis part 64 gradually increases with the lapse of time, the detection result determination part 66 may determine that the drone DN approaches the sound source detection unit UD.

For example, when a sound pressure level of a predetermined frequency measured at a certain time is smaller than a sound pressure level of the same frequency measured at a time later than the certain time, it may be determined that the sound pressure is increased with the lapse of time, and the drone DN is approaching. Further, the sound pressure level is measured three times or more, and it may be determined that the drone DN is approaching based upon transition of a statistical value (for example, a dispersion value, an average value, a maximum value, a minimum value, and the like).

In FIG. 14, when the monitoring device 10 detects the drone DN based upon the sound data in the sound detection area SDar collected by the sound detection sensor SD (that is, the microphone array MA), the drone information (for example, the direction and the height from the arrangement place of the sound detection sensor SD to the drone DN) is transmitted to the camera control device 1 (St12).

The camera control device 1 displays, for example, the omnidirectional captured image IMG1, in which the sound detection area SDar of the monitoring area 8 captured by the omnidirectional camera CA is defined as a subject, in the display area AR1 of the monitoring monitor MN2, and the marker image MK1 for identifying the drone DN is plotted (displayed) on the omnidirectional captured image IMG1 (refer to FIG. 10) (St13) using the drone information (for example, the direction and the height) transmitted from the monitoring device 10 at the step St12. Further, the camera control device 1 calculates the optical axis direction and the zoom magnification capable of imaging the drone DN in the PTZ camera CZ, and generates the PTZ control instruction including the calculation result using the drone information (for example, the direction and the height) transmitted from the monitoring device 10 at the step St12 and the drone information (for example, the distance and the direction) transmitted from the monitoring device 10 at step St4. The camera control device 1 transmits the generated PTZ control instruction to the PTZ camera CZ via the network NW (St14).

The PTZ camera CZ changes at least one of the optical axis direction and the zoom magnification according to the PTZ control instruction transmitted from the camera control device 1 at the step St14, and then images the drone DN according to the changed optical axis direction and the changed zoom magnification. The PTZ camera CZ transmits the image of the captured drone DN (the PTZ captured image) to the camera control device 1 via the network NW (St15). The camera control device 1 displays the PTZ captured image IMG2 (refer to FIG. 12) transmitted from the PTZ camera CZ at the step St15 on the PTZ camera monitor MN3 (St16).

Further, the sound detection sensor SD does not perform sound collection processing of the sound in the sound detection area SDar at the step St9 illustrated in FIG. 14 only once, but continues to perform the sound collection processing every time (in other words, the sound collection processing is repeated). Accordingly, the monitoring device 10 can detect the drone DN while the drone DN exists in the sound detection area SDar, however, when the drone DN is out of the sound detection area SDar (that is, when the drone DN moves by flying and does not exist in the sound detection area SDar), the drone DN cannot be detected. Therefore, when the drone DN is deviated and moves out of both the radar detection area RDar and the sound detection area SDar, the monitoring device 10 shifts from a detection mode to a detection standby mode. Thereafter, the processing in FIG. 14 is sequentially repeated from the step S1 as loop processing.

Next, a second operation procedure of the flying object detection system 100 according to the first exemplary embodiment will be described in detail with reference to FIGS. 19 to 21.

Figure 19:
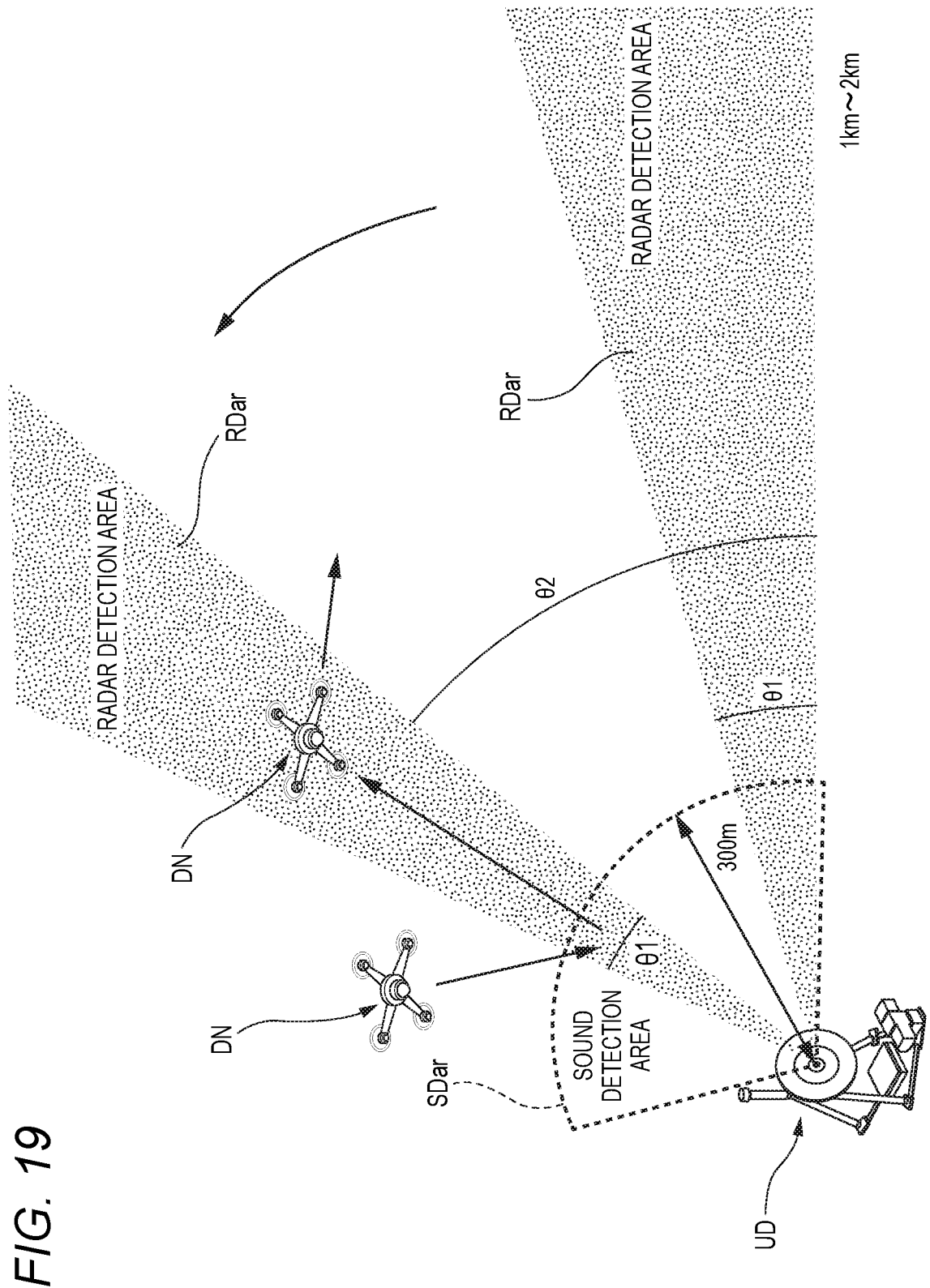
FIG. 19 is a diagram illustrating a movement example of a drone that is detected in the order of a sound detection area and a radar detection area.

FIG. 19 is a diagram illustrating a movement example of the drone DN that is detected in the order of the sound detection area Sdar and the radar detection area RDar. FIG. 20 is a sequence diagram illustrating an example of the second operation procedure of the flying object detection system 100 according to the detection processing of the drone DN moving in a flight route in FIG. 19. FIG. 21 is an explanatory diagram illustrating a modified example of a radar irradiation angle change at step St22 in FIG. 20. Further, in the descriptions of FIG. 20, the same step numbers will be denoted with respect to the processing overlapping with the descriptions in FIG. 14, the descriptions thereof will be simplified or omitted, and different contents will be described.

In the second operation procedure, until the drone DN is detected by the monitoring device 10 based upon the sound data collected by the sound detection sensor SD, a radar detection area is a radar detection area RDar1 including an area that is separated from the arrangement place of the radar sensor RD by about 1 km to 2 km (as an example) in a direction of a range of a predetermined irradiation angle $\theta1$ from the ground including the arrangement place of the radar sensor RD of the sound source detection unit UD. However, after the drone DN is detected by the monitoring device 10, according to the radar irradiation angle change instruction from the camera control device 1, while maintaining the same irradiation angle $\theta1$, the radar detection area becomes a radar detection area RDar2 in which a reference direction of $\theta1$ is changed by about $\theta2$ from a direction parallel to the ground passing through a center position of the housing of the microphone array MA, thereby being directed to an upper part of the detected drone DN. On the other hand, the sound detection area SDar includes the area that is separated from the arrangement place thereof by about 300 m (as an example) in the horizontal direction and the vertical direction toward which the arrangement place of the radar sensor RD of the sound source detection unit UD (for example, the sound collected surface of the sound of the microphone array MA) is directed.

As illustrated in FIG. 19, in the second operation procedure of the flying object detection system 100, it is assumed that as an example, the drone DN moves by flying from above (just above) when viewed from the arrangement place of the sound source detection unit UD, and approaches the sound source detection unit UD while descending toward the sound source detection unit UD. Specifically, the drone DN is first detected by the monitoring device 10 in the sound detection area SDar, after which the drone DN is deviated from the sound detection area SDar. However, the drone DN flies into the radar detection area RDar2 changed according to the detection in the sound detection area SDar, and is detected by the radar sensor RD in the radar detection area RDar2, after which the drone DN further moves by flying to an area out of the range of the radar detection area RDar and the sound detection area SDar.

Figure 20:
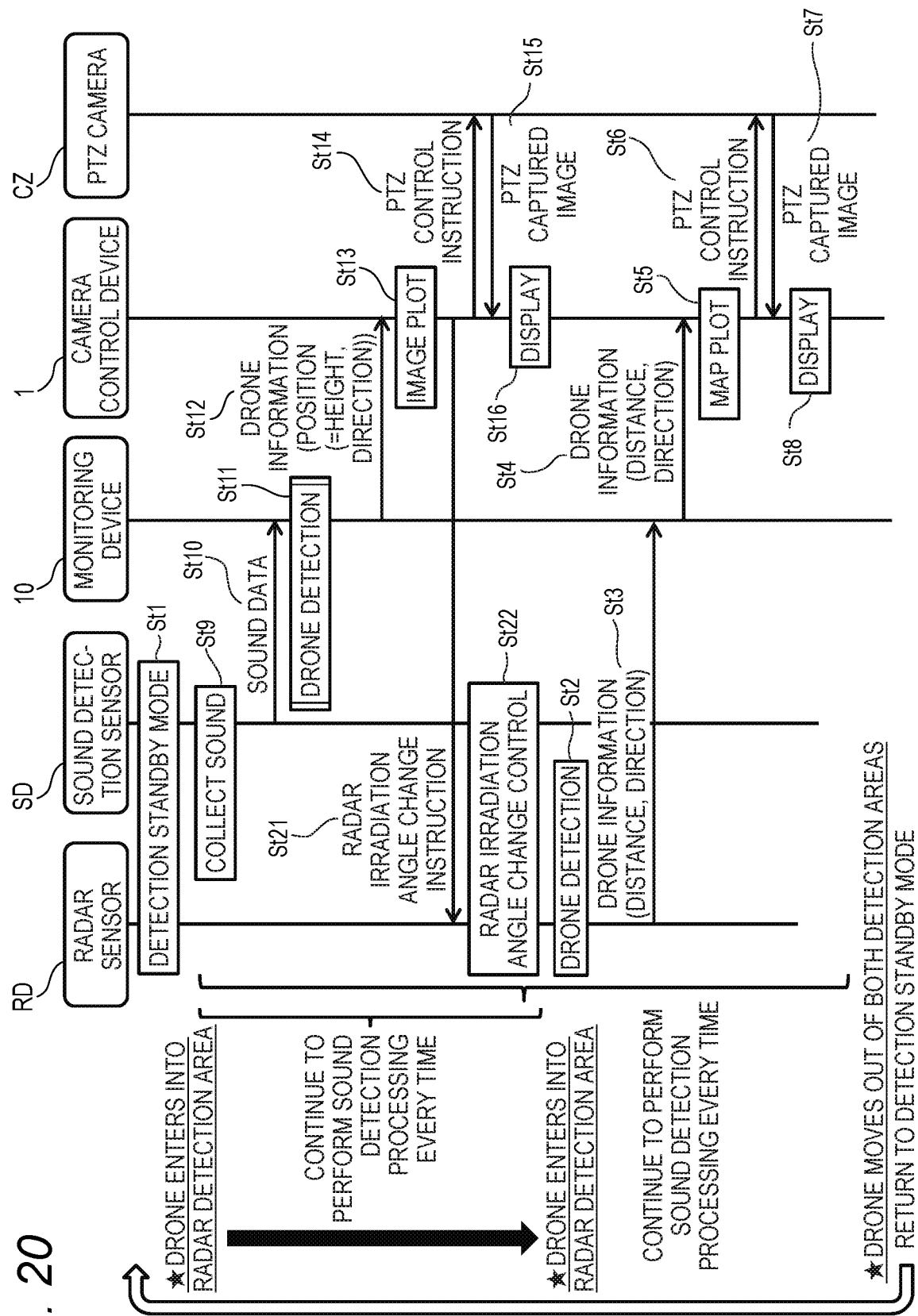
FIG. 20 is a sequence diagram illustrating an example of a second operation procedure of a flying object detection system according to detection processing of a drone moving in a flight route in FIG. 19.

In FIG. 20, it is assumed that at the time of the step St1, the drone DN enters upward (that is, just above, for example, in the sound detection area SDar of the monitoring area 8) when viewed from the arrangement place of the sound source detection unit UD (refer to FIG. 19).

In this case, the sound generated by the drone DN is collected by the microphone array MA of the sound detection sensor SD (St9). The sound data collected by the microphone array MA are transmitted to the monitoring device 10 (St10). The monitoring device 10 detects the presence or absence of the drone DN using the sound data collected by the microphone array MA according to the method illustrated in FIGS. 17 and 18 (St11).

When the drone DN is detected based upon the sound data in the sound detection area SDar collected by the sound detection sensor SD (that is, the microphone array MA), the monitor device 10 transmits the drone information (for example, the direction and the height from the arrangement place of the sound detection sensor SD to the drone DN) to the camera control device 1 (St12).

The camera control device 1 displays, for example, the omnidirectional captured image IMG1, in which the sound detection area SDar of the monitoring area 8 captured by the omnidirectional camera CA is defined as a subject, in the display area AR1 of the monitoring monitor MN2, and the marker image MK1 for identifying the drone DN is plotted (displayed) on the omnidirectional captured image IMG1 (refer to FIG. 10) (St13) using the drone information (for example, the direction and the height) transmitted from the monitoring device 10 at step St12.

Further, the camera control device 1 calculates an irradiation angle (in other words, an irradiation range) for changing the irradiation angle of the detection signal in the radar sensor RD using the drone information (for example, the direction and the height) transmitted from the monitor 10 at the tape St12, and then generates the radar irradiation angle change instruction including the calculation result. The camera control device 1 transmits the radar irradiation angle change instruction to the radar sensor RD via the network NW (St21). Based upon the radar irradiation angle change instruction transmitted from the camera control device 1 at the step St21, the radar sensor RD is controlled so as to change the radar detection area from the current radar detection area RDar1 (refer to FIG. 19) to the radar detection area RDar2 (refer to FIG. 19) (St22).

Further, in parallel with the processing of the step St21, the camera control device 1 calculates the optical axis direction and the zoom magnification capable of imaging the drone DN in the PTZ camera CZ using the drone information (for example, the direction and the height) transmitted from the monitoring device 10 at the step St12, and then generates the PTZ control instruction including the calculation result. The camera control device 1 transmits the generated PTZ control instruction to the PTZ camera CZ via the network NW (St14). Since the processing up to the step St16 after the step St14 is the same as that of FIG. 14, the descriptions of the processing at each step will be omitted.

Further, the radar sensor RD does not perform the sound collection processing of the sound in the sound detection area SDar at the step St9 illustrated in FIG. 20 only once, but continues to perform the sound collection processing thereof every time (in other words, the sound collection processing is repeated). Accordingly, the monitoring device 10 can detect the drone DN while the drone DN exists in the sound detection area SDar, however, when the drone DN is out of the sound detection area SDar (that is, when the drone DN moves by flying and does not exist in the sound detection area SDar), the drone DN cannot be detected.

Next, after performing the processing of the step St22, it is assumed that the drone DN enters into the overlapping area between the radar detection area RDar2 which is changed according to the change of the irradiation angle and the sound detection area SDar from the sound detection area SDar of the monitoring area 8, and then enters into the radar detection area Rdar2 (refer to FIG. 19).

When the drone DN enters into the radar detection area RDar2, the drone DN is detected by the radar sensor RD at step St2, and the radar sensor RD transmits the drone information (for example, the distance and the direction from the arrangement place of the radar sensor RD to the drone DN) as the detection output of the drone DN to the monitoring device 10 via the network NW at step St3. The direction of the drone DN is, for example, the direction in which the detection signal (that is, the reflection detection signal) reflected by the drone DN arrives when viewed from the radar sensor RD.

The monitoring device 10 receives and acquires the drone information transmitted from the radar sensor RD, and then transmits the drone information to the camera control device 1 (St4).

The camera control device 1 displays, for example, the map MP1 of the monitoring area 8 in the display area AR1 of the monitoring monitor MN2, and the image Dnic such as the thumbnail of the drone DN, and the like is plotted (displayed) on the map MP1 (for example, the two-dimensional map, refer to FIG. 11) at step St5 using the drone information (for example, the distance and the direction) transmitted from the monitoring device 10 at step St4. Further, the camera control device 1 calculates the optical axis direction and the zoom magnification capable of imaging the drone DN in the PTZ camera CZ using the drone information (for example, the distance and the direction) transmitted from the monitor device 10 at step St4, thereby generating the PTZ control instruction including the calculation result. The camera control device 1 transmits the generated PTZ control instruction to the PTZ camera CZ via the network NW at step St6.

The PTZ camera CZ changes at least one of the optical axis direction and the zoom magnification according to the PTZ control instruction transmitted from the camera control device 1 at step St6, after which the drone DN is imaged by the PTZ camera CZ according to the changed optical axis direction and the changed zoom magnification. The PTZ camera CZ transmits the image (the PTZ captured image) of the captured drone DN to the camera control device 1 via the network NW at step St7. The camera control device 1 displays the PTZ captured image IMG2 (refer to FIG. 12) transmitted from the PTZ camera CZ at the step St7 on the PTZ camera monitor MN3 at step St8.

Further, regardless of the presence or absence of the change of the irradiation angle at step St22, the radar sensor RD does not perform the detection processing of the drone DN at step St2 illustrated in FIG. 20 only once, but continues to perform the detection processing of the drone DN at step St2 every time (in other words, the detection processing is repeated). Therefore, the radar sensor RD can detect the drone DN while the drone DN exists in radar detection areas RDar1 and RDar2, however, when the drone DN is deviated from the radar detection areas RDar1 and Rdar2 (that is, the drone DN moves by flying, and does not exist in the radar detection areas RDar1 and RDar2), the drone DN cannot be detected. Therefore, when the drone DN is deviated and moves out of either one of the radar detection areas RDar2 and the sound detection area SDar, the monitoring device 10 shifts from the detection mode to the detection standby mode. Thereafter, the processing in FIG. 20 is sequentially repeated from the step S1 as the loop processing.

Further, the camera control device 1 calculates the irradiation angle for changing the irradiation angle (in other words, the irradiation range) of the detection signal at the step St21, however, as illustrated in FIG. 21, the radar irradiation angle change instruction for widening the irradiation range may be generated by narrowing down the output of the detection signal (that is, by lowering transmission power of the detection signal by lowering the gain of the variable amplifier 85). In this case, the radar sensor RD is changed from the current radar detection area RDar1 to a radar detection area RDar3 as illustrated in FIG. 21 according to the radar irradiation angle change instruction transmitted from the camera control device 1. The radar detection area RDar3 includes an area that is separated from the arrangement place of the radar sensor RD by approximately 500 m (as an example) in a direction within a range of a predetermined irradiation angle θ3 (>θ1) from the ground including the arrangement place of the radar sensor RD of the sound source detection unit UD. Accordingly, even when the drone DN moves to an area where the sound detection area SDar and the radar detection area RDar1 are not overlapped with each other, the flying object detection system 100 can easily detect the drone DN in the radar detection area RDar3, thereby contributing to the early detection of the drone DN.

As described above, the flying object detection system 10 includes the sound detection sensor SD including the microphone array MA capable of collecting the sound in the sound detection area SDar of the monitoring area; and the radar sensor RD that detects the flying object (for example, the drone DN) in flight in the radar detection area RDar of the monitoring area and measures the distance up to the flying object. The flying object detection system 100 includes the monitoring device 10 (an example of the control device) that not only detects the presence or absence of the flying object based upon the sound data in the collected sound detection area SDar, but also receives the measured distance up to the flying object. The monitoring device 10 displays the information (for example, the marker image MK1) indicating the position of the flying object viewed from the arrangement places of the sound detection sensor SD and the radar sensor RD on the monitoring monitor MN2 using the distance up to the flying object and the detection output of the flying object.

Accordingly, regardless of a state of a sound environment of the monitoring area 8 (for example, a quiet state or a noisy state), since the flying object detection system 100 can detect the presence or absence of the unmanned flying object (for example, the drone DN) in the monitoring area 8 at an early stage, for example, it is possible to perform countermeasures such as an effective initial action, and the like against an unpredicted situation, thereby suppressing the convenience of the user from deteriorating. That is, while effectively utilizing different characteristics (for example, a size of a detection target space and a width thereof) of the detection areas between the sound detection area SDar and the radar detection area RDar, the flying object detection system 100 uses a combination of the sound detection sensor SD and the radar sensor RD, thereby performing the detection of the drone DN in a wide range at an early stage.

Further, the camera control device 1 (an example of the control device) superimposes the information indicating the position of the flying object and the information indicating the arrangement place of the sound source detection unit UD on the map MP1 displayed on the monitoring monitor MN2, thereby displaying the superimposed information thereon. Accordingly, in the monitoring monitor MN2, the user can easily and apparently grasp the position on the map MP1 where the drone DN is detected on the monitoring monitor MN2, and can accurately take countermeasures such as a necessary initial action, and the like, thereby improving the convenience of the user.

Further, the sound detection sensor SD further includes the omnidirectional camera CA (an example of the camera) for imaging the monitoring area in a wide range. The camera control device 1 (an example of the control device) superimposes the marker image MK1 (an example of the marker) indicating the position of the flying object on the omnidirectional captured image IMG1 of the omnidirectional camera CA, thereby displaying the superimposed marker image MK1 thereon on the monitoring monitor MN2. Accordingly, the user can visually grasp the position of the flying object such as the drone DN, and the like while viewing the real-time omnidirectional captured image IMG1 on the monitoring monitor MN2.

Further, the flying object detection system 100 further includes the PTZ camera CZ (an example of a second camera) in which the optical axis direction and the zoom magnification are variable. When the flying object is detected based upon the detection output from the radar sensor RD or the sound data from the sound detection sensor SD, the camera control device 1 (an example of the control device) allows the PTZ camera CZ to change the optical axis direction and the zoom magnification, and displays the PTZ captured image IMG2 according to the changed optical axis direction and the changed zoom magnification on the PTZ camera monitor MN3 (an example of the second monitor). Accordingly, the user can easily grasp the appearance and structural characteristics of the drone DN detected in the radar detection area RDa and the sound detection area SDar of the monitoring area 8 or both overlapping area thereof, the load of the drone DN, and the like on the PTZ camera monitor MN3.

Further, when the flying object is detected based upon the sound data from the sound detection sensor SD earlier than the radar sensor RD, the camera control device 1 (an example of the control device) changes the irradiation angle of the detection signal irradiated from the radar sensor based upon the detection output of the flying object. Thus, for example, when the drone DN does not exist in the current radar detection area RDar1 (refer to FIG. 19), and is approaching the sound source detection unit UD while descending from above (just above) the sound source detection unit UD, since the flying object detection system 100 can irradiate the detection signal from the radar sensor RD in the direction in which the drone DN is detected based upon the sound data collected by the sound detection sensor SD, even when the drone DN is deviated from the sound detection sensor SD, the drone DN can be easily tracked by the radar sensor RD.

Further, when the flying object is detected based upon the sound data from the sound detection sensor SD earlier than the radar sensor RD, the camera control device 1 (an example of the control device) changes the irradiation range of the detection signal irradiated from the radar sensor RD based upon the detection output of the flying object. Accordingly, even when the drone DN moves to the area where the sound detection area SDar and the radar detection area RDar1 are not overlapped with each other, the flying object detection system 100 can easily detect the drone DN in the radar detection area RDar3, thereby contributing to the early detection of the drone DN.

Further, when the flying object is not detected in either one of the sound detection area SDar and the radar detection area RDar, the monitoring device 10 (an example of the control device) shifts from the detection mode in which the detection processing of the flying object is performed to the detection standby mode in which the detection processing of the flying object is not performed. As a result, even when the monitoring device 10 acquires the sound data from the sound detection sensor SD, it is possible to omit the execution of the analysis processing (for example, the detection processing of the drone DN) using the sound data, thereby making it possible to reduce a processing load.

Further, the sound detection sensor SD and the radar sensor RD are disposed each other within a predetermined distance, and the radar sensor RD is disposed above the sound detection sensor SD. Accordingly, the detection signal irradiated (transmitted) from the radar sensor RD is hardly obstructed by obstacles, and the like existing in the monitoring area 8, thereby making it possible to suppress the deterioration in the detection accuracy of the drone DN.

As described above, while various exemplary embodiments are described with reference to the drawings, it goes without saying that the present disclosure is not limited thereto. It is obvious that those skilled in the art can come up with various modifications, corrections, substitutions, additions, deletions, and equivalents within the scope described in the scope of the patent claims, and it should be understood that those naturally belong to the technical scope of the present disclosure. Further, each component in the above-described various exemplary embodiments may be arbitrarily combined with each other within the scope without departing from the gist of the invention.

The present application is based upon Japanese Patent Application (Patent Application No. 2018-105396) filed on May 31, 2018, the contents of which are incorporated herein by reference.

What is claimed is:

1. A flying object detection system, comprising:
   a radar configured to detect a flying object and to measure a distance to the flying object by detecting the flying object in flight in a first detection area of a monitoring area;
   a camera configured to capture an image of the flying object in the monitoring area in response to the radar detecting the flying object in the first detection area of the monitoring area;
   a sensor configured to collect a sound in a second detection area of the monitoring area, the second detection area of the monitoring area being different than the first detection area of the monitoring area; and
   a control device configured to display, on a first monitor, the monitoring area, the image of the flying object in the monitoring area, and the distance to the flying object in the monitoring area in a map display screen, wherein the control device is further configured to detect a presence or an absence of the flying object in the second detection area based on sound data of the sound collected by the sensor, the camera is configured to capture an image of the monitoring area in response to the flying object being detected in the monitoring area, the control device is configured to display the image of the monitoring area captured by the camera in a monitoring image screen, the monitoring image screen being displayed on the first monitor and different than the map display screen, and the control device is configured to switch between the monitoring image screen and the map display screen according to an operation of a user.

2. The flying object detection system according to claim 1, wherein the control device is configured to superimpose information on a position of the flying object and arrangement places of the radar, the camera, and the sensor on a map displayed on the first monitor.

3. The flying object detection system according to claim 1, wherein the control device is configured to superimpose, in the monitoring image screen, a marker indicating a position of the flying object on the image of the monitoring area captured by the camera.

4. The flying object detection system according to claim 1, further comprising;

a second camera configured to alter an optical axis direction and a zoom magnification, wherein when the flying object is detected by the radar or the sensor, the control device alters the optical axis direction and the zoom magnification of the second camera and displays an image captured by the second camera according to the optical axis direction and the zoom magnification altered by the control device on a second monitor.

5. The flying object detection system according to claim 1, wherein when the flying object is detected by the sensor earlier than the radar, the control device alters an irradiation angle of a detection signal irradiated from the radar based on a detection of the flying object by the sensor.

6. The flying object detection system according to claim 1, wherein when the flying object is detected by the sensor earlier than the radar, the control device alters an irradiation range of a detection signal irradiated from the radar based on a detection of the flying object by the sensor.

7. The flying object detection system according to claim 1, wherein when the flying object is not detected in both of the first detection area and the second detection area, the control device shifts a mode of the control device from a detection mode in which a detection processing of the flying object is performed to a detection standby mode in which the detection processing of the flying object is paused.

8. The flying object detection system according to claim 1, wherein the sensor and the radar are disposed within a predetermined distance, and the radar is disposed above the sensor.

9. The flying object detection system according to claim 3, wherein the camera includes an omnidirectional camera, and the image of the monitoring area captured by the camera is an omnidirectional image.

10. The flying object detection system according to claim 9, wherein the omnidirectional camera captures the omnidirectional image of the second detection area of the monitoring area.

11. The flying object detection system according to claim 10, wherein when the control device detects the presence of the flying object in the second detection area based on the sound data, the control device is configured to generate a sound pressure map in which calculation values of sound pressure levels are allocated to corresponding positions in the omnidirectional image, and the control device is configured to display the sound pressure map in a sound pressure heat map screen, the sound pressure heat map screen being displayed on the first monitor, different than the map display screen, and different than the monitoring image screen.

12. The flying object detection system according to claim 11, wherein the control device is configured to superimpose, in the sound pressure heat map screen, a marker indicating a position of the flying object on the sound pressure map.

13. The flying object detection system according to claim 12, wherein when the flying object is not detected by the radar and the control device, the control device is in a detection standby mode.

14. The flying object detection system according to claim 12, wherein an optical axis of the omnidirectional camera and a center axis of a housing of the sensor are coaxial.

15. The flying object detection system according to claim 1, wherein the control device detects the presence or the absence of the flying object in the second detection area by comparing the sound data with a predetermined number of frequencies registered in a memory.

16. The flying object detection system according to claim 15, wherein the control device detects the presence of the flying object in the second detection area when the sound data for a certain number of the predetermined number of frequencies exceeds a threshold value.

17. The flying object detection system according to claim 16, wherein the sensor is configured to collect the sound plural times, and the control device is configured to determine that the flying object is approaching based on transition of a statistical value in the sound data of the sound.

18. The flying object detection system according to claim 1, wherein the radar is further configured to acquire a direction of the flying object, the control device is configured to calculate, using the distance to the flying object and the direction of the flying object, an optical axis direction and a zoom magnification for imaging the flying object with the camera, and the control device is configured to transmit an instruction to the camera for capturing the image of the flying object, the instruction including the optical axis direction and the zoom magnification.

* * * * *